US012700360B2

(12) United States Patent
Park et al.

(10) Patent No.: US 12,700,360 B2
(45) Date of Patent: Aug. 4, 2026

(54) DISPLAY DEVICE

(71) Applicant: SAMSUNG DISPLAY CO., LTD., Yongin-si (KR)

(72) Inventors: Sehyuk Park, Yongin-si (KR); Jaekeun Lim, Yongin-si (KR); Jin-Wook Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/922,560

(22) Filed: Oct. 22, 2024

(65) Prior Publication Data

US 2025/0252917 A1 Aug. 7, 2025

(30) Foreign Application Priority Data

Feb. 7, 2024 (KR) ........................ 10-2024-0018655

(51) Int. Cl.

| | |
|---|---|
| ***G09G 3/3233*** | (2016.01) |
| ***G09G 3/00*** | (2006.01) |
| ***G09G 3/3266*** | (2016.01) |

(52) U.S. Cl.

CPC ........... *G09G 3/3233* (2013.01); *G09G 3/035* (2020.08); *G09G 3/3266* (2013.01); *G09G 2300/0426* (2013.01); *G09G 2300/0452* (2013.01); *G09G 2300/0819* (2013.01); *G09G 2300/0861* (2013.01); *G09G 2310/0297* (2013.01); *G09G 2310/08* (2013.01); *G09G 2320/0214* (2013.01); *G09G 2330/021* (2013.01)

(58) Field of Classification Search

CPC .... G09G 3/3233; G09G 3/3291; G09G 3/035; G09G 3/3266

See application file for complete search history.

(56) References Cited

U.S. PATENT DOCUMENTS

| | | | | |
|---|---|---|---|---|
| 10,211,270 | B2 | 2/2019 | Ha | |
| 10,354,582 | B2 | 7/2019 | Kim | |
| 10,733,935 | B2 | 8/2020 | Cha et al. | |
| 11,094,258 | B2 * | 8/2021 | Park | G09G 3/3233 |
| 11,908,418 | B2 | 2/2024 | Lee et al. | |
| 11,935,453 | B2 | 3/2024 | Park et al. | |

FOREIGN PATENT DOCUMENTS

| | | | |
|---|---|---|---|
| KR | 10-2018-0061860 | A | 6/2018 |
| KR | 10-2022-0156147 | A | 11/2022 |
| KR | 10-2023-0013949 | A | 1/2023 |
| KR | 10-2482846 | B1 | 1/2023 |
| KR | 10-2541255 | B1 | 6/2023 |

* cited by examiner

*Primary Examiner* — Sardis F Azongha
(74) *Attorney, Agent, or Firm* — F. CHAU & ASSOCIATES, LLC

(57) ABSTRACT

A display device includes a plurality of data lines and a plurality of pixels. Each of the plurality of pixels includes a light emitting element, a first transistor, a second transistor to receive a first scan signal, third transistors. The plurality of data lines include a plurality of first group data lines and a plurality of second group data lines. The plurality of pixels include a plurality of first group pixels connected to the plurality of first group data lines and a plurality of second group pixels connected to the plurality of second group data lines. The first scan signal and a first clock signal are applied to different transistors of the third transistors.

20 Claims, 25 Drawing Sheets

DISPLAY DEVICE

CROSS-REFERENCE TO RELATED APPLICATIONS

This application claims priority under 35 U.S.C. § 119 to Korean Patent Application No. 10-2024-0018655 filed on Feb. 7, 2024, in the Korean Intellectual Property Office, the disclosure of which is herein incorporated by reference in its entirety.

BACKGROUND

1. Technical Field

Embodiments of the present disclosure described herein relate to a display device having reduced power consumption, and more particularly to a display device including a plurality of pixel groups connected to a shared scan line and receiving different clock signals.

2. Discussion Description of the Related Art

Many electronic devices include a display panel for displaying an image. These electronic devices may include televisions, mobile phones, tablets, computers, navigation, and game consoles.

The display device may be an organic light emitting display device. The organic light emitting display device may include a light emitting element. The light emitting element may generate light through the recombination of an electron and a hole. Organic light emitting display devices typically have rapid response speed and lower power consumption.

SUMMARY

Embodiments of the present disclosure provide a display device having reduced power consumption.

Embodiments of the present disclosure provide a display device including a plurality of pixel groups connected to a shared scan line and receiving different clock signals.

According to an embodiment, a display device may include a plurality of data lines and a plurality of pixels, wherein each of the plurality of pixels includes a light emitting element, a first transistor including a gate electrode connected to a first node, a first electrode connected to a second node electrically connected to a first power line, and a second electrode connected to a third node electrically connected to the light emitting element, a second transistor electrically connected to a first scan line, and connected to between a data line of the plurality of data lines and the first electrode of the first transistor; and a first-third transistor and a second-third transistor connected between the first node and the third node, wherein the plurality of data lines include: a plurality of first group data lines, and a plurality of second group data lines. The plurality of pixels include a plurality of first group pixels connected to the plurality of first group data lines, and a plurality of second group pixels connected to the plurality of second group data lines, wherein the first scan line is electrically connected to one of the first-third transistor and the second-third transistor in each of the plurality of first group pixels and the plurality of second group pixels.

The first-third transistor and the second-third transistor may be connected in series between the first node and the third node, a first clock signal may be applied to a remaining one of the first-third transistor and the second-third transistor in each of the plurality of first group pixels, and a second clock signal different from the first clock signal may be applied to a remaining one of the first-third transistor and the second-third transistor in each of the plurality of second group pixels.

An activation period of the first clock signal may be in a non-overlap state with an activation period of the second clock signal.

A frame period may include a first sub-frame period and a second sub-frame period subsequent to the first sub-frame period, wherein the first clock signal has an activation level and the second clock signal has a deactivation level during the first sub-frame period, and the second clock signal has the activation level and the first clock signal has the deactivation level during the second sub-frame period.

According to an embodiment, a display device may include a plurality of data lines and a plurality of pixels. Each of the plurality of pixels may include a light emitting element, a first transistor including a gate electrode connected to a first node, a first electrode connected to a second node electrically connected to a first power line, and a second electrode connected to a third node electrically connected to the light emitting element, a second transistor to receive a first scan signal, and connected to between a relevant line of the plurality of data lines and the first electrode of the first transistor, and a plurality of third transistors connected between the first node and the third node. The plurality of data lines may include a plurality of first group data lines and a plurality of second group data lines. The plurality of pixels may include a plurality of first group pixels connected to the plurality of first group data lines and a plurality of second group pixels connected to the plurality of second group data lines. The first scan signal and a first clock signal may be applied to different transistors of the third plurality of transistors in each of the plurality of first group pixels. The first scan signal and a second clock signal different from the first clock signal may be applied to different transistors of the third transistors in each of the plurality of second group pixels.

An activation period of the first clock signal may be in a non-overlap state with an activation period of the second clock signal.

A frame period may include a first sub-frame period and a second sub-frame period subsequent to the first sub-frame period, and the first clock signal may have an activation level, and the second clock signal has a deactivation level, during the first sub-frame period. The second clock signal has the activation level and the first clock signal may have the deactivation level, during the second sub-frame period.

The display device may further include a demultiplexer connected to the plurality of data lines, the demultiplexer may include a plurality of first control transistors connected to the plurality of first group data lines, respectively, to receive a first control signal, and a plurality of second control transistors connected to the plurality of second group data lines, respectively, to receive a second control signal.

The first control signal alternately may have the activation level and the deactivation level, and the second control signal has the deactivation level, during the first sub-frame period, and the first control signal may have the deactivation level and the second control signal alternately has the activation level and the deactivation level during the second sub-frame period.

The plurality of third transistors may be formed as a first dual transistor.

Each of the plurality of pixels further may include a plurality of fourth transistors connected between the first node and an initialization voltage line for applying an initialization voltage, a second scan signal and the first clock signal may be applied to different transistors of the plurality of fourth transistors in each of the plurality of first group pixels, and the second scan signal and the second clock signal may be applied to different transistors of the plurality of fourth transistors in each of the plurality of second group pixels.

Each of the plurality of pixels may further include a plurality of fifth transistors connected between the initialization voltage line and the light emitting element, a third scan signal different from the second scan signal and the first clock signal may be applied to different transistors of the fifth transistors in each of the plurality of first group pixels, and the third scan signal and the second clock signal may be applied to different transistors of the fifth transistors in each of the plurality of second group pixels.

The plurality of fourth transistors may be formed as a second dual transistor, and the plurality of fifth transistors may be formed as a third dual transistor.

The display device may further include a driving circuit configured to output the first scan signal. The driving circuit may include a plurality of scan stages including a plurality of first scan stages and a plurality of second scan stages. Each scan stage of the plurality of scan stages may include a first input node and a second input node, and a first scan clock signal may be applied to the first input node of each scan stage of the plurality of first scan stages, and a second scan clock signal different from the first scan clock signal is applied to the second input node of each scan stage of the plurality of first scan stages.

The second scan clock signal may be applied to the first input node of each scan stage of the plurality of second scan stages, and the first scan clock signal may be applied to the second input node of each scan stage of the plurality of second scan stages.

The display device may include a driving circuit configured to output the first scan signal, wherein the driving circuit may include a plurality of scan stages including a plurality of first scan stages, a plurality of second scan stages, a plurality of third scan stages, and a plurality of fourth scan stages. Each scan stage of the plurality of scan stages may include a first input node and a second input node, wherein a first scan clock signal is applied to the first input node of each scan stage of the plurality of first scan stages, and a second scan clock signal different from the first scan clock signal is applied to the second input node of each scan stage of the plurality of first scan stages, the second scan clock signal may be applied to the first input node of each scan stage the plurality of second scan stages, and a third scan clock signal different from the first scan clock signal and the second scan clock signal is applied to the second input node of each scan stage of the plurality of second scan stages, the third scan clock signal may be applied to the first input node of each scan stage of the plurality of third scan stages, and a fourth scan clock signal different from the first scan clock signal, the second scan clock signal, and the third scan clock signal may be applied to the second input node of each scan stage of the plurality of third scan stages, and the fourth scan clock signal may be applied to the first input node of each scan stage of the plurality of fourth scan stages, and the first scan clock signal is applied to the second input node of each scan stage of the plurality of fourth scan stages.

According to an embodiment, a display device may include a plurality of pixels including a plurality of first group pixels and a plurality of second group pixels. Each pixel of the plurality of pixels may include a light emitting element, a first transistor connected between a first power line for applying a first power supply voltage, and the light emitting element, and including a gate electrode connected to a first node, a second transistor connected between the first transistor and a data line for applying a data signal and including a gate electrode to receive a first scan signal, and a plurality of third transistors connected between the first transistor and the first node. The first scan signal and a first clock signal may be applied to different transistors of the plurality of third transistors in each pixel of the plurality of first group pixels, and the first scan signal and a second clock signal different from the first clock signal may be applied to different transistors of the plurality of third transistors in each pixel of the plurality of second group pixels.

Each pixel of the plurality of pixels may further include a plurality of fourth transistors connected between the first node and an initialization voltage line for applying an initialization voltage, and a plurality of fifth transistors connected between the initialization voltage line and the light emitting element.

A second scan signal different from the first scan signal and the first clock signal may be applied to different transistors of the plurality of fourth transistors in each pixel of the plurality of first group pixels. The second scan signal and the second clock signal may be applied to different transistors of the plurality of fourth transistors in each pixel of the plurality of second group pixels.

A third scan signal different from the second scan signal and the first clock signal may be applied to different transistors of the plurality of fifth transistors in each pixel of the plurality of first group pixels. The third scan signal and the second clock signal may be applied to different transistors of the plurality of fifth transistors in each pixel of the plurality of second group pixels.

The third transistors may be formed in a form of a first dual transistor, the fourth transistors may be formed in a form of a second dual transistor, and the fifth transistors may be formed in a form of a third dual transistor.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
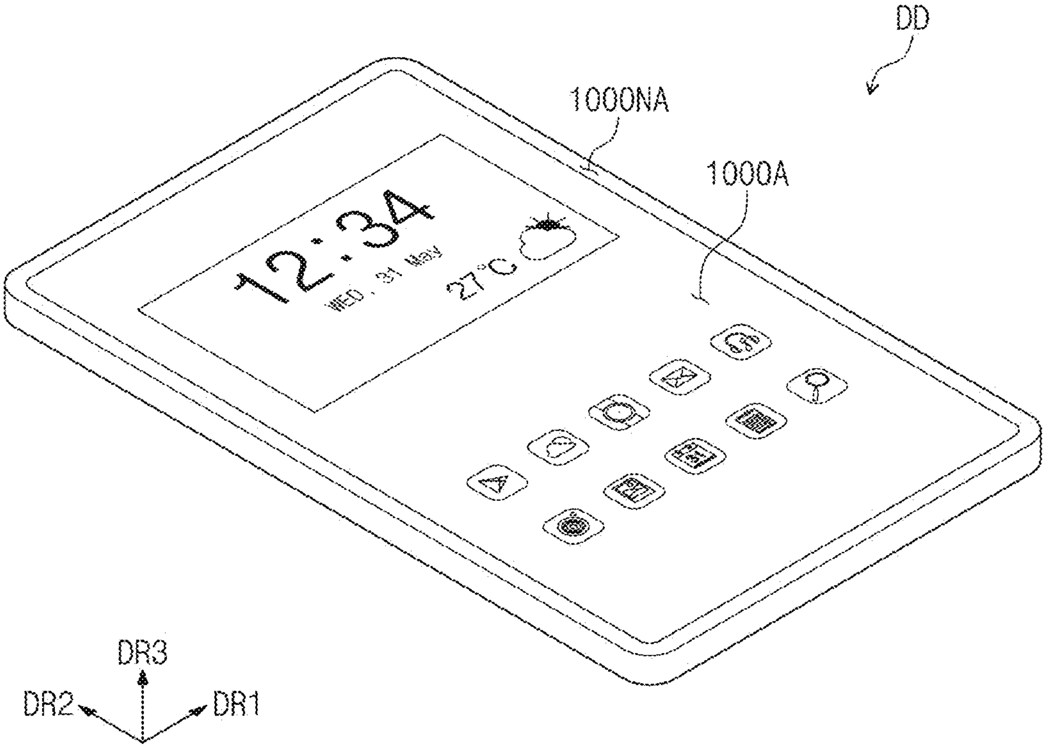
FIG. 1 is a perspective view of a display device according to an embodiment of the present disclosure.

In the specification, the expression that a first component (or region, layer, part, portion, etc.) is "on", "connected to", or "coupled to" a second component may mean that the first component may be directly on, connected to, or coupled to the second component, or may mean that a third component is interposed therebetween. The expression that the first component is "directly disposed on", "directly connected with", or "directly coupled with" the second component may mean that no third component is interposed between the first component and the second component.

The same reference numeral will be assigned to the same component. In addition, in the drawings, thicknesses, proportions, and dimensions of components may be exaggerated to describe the technical features effectively. The terminology "and/or" may include any and all combinations of one or more of associated components Although the terminology "first", "second", etc. may be used to describe various components, the components should not be construed as being limited by the terms. The terminology is only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terminology "under", "at a lower portion", "above", "an upper portion" are used to describe the relationship between components illustrated in drawings. The terms are relative and are described with reference to a direction indicated in the drawing.

It will be further understood that the terminology "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms defined in the dictionaries and commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device according to an embodiment of the present disclosure.

Referring to FIG. 1, a display device DD may be a device activated in response to an electrical signal. The display device DD may include an active region 1000A and a peripheral region 1000NA. The display device DD may display an image in the active region 1000A. The active region 1000A may include a surface defined by a first direction DR1 and a second direction DR2. The peripheral region 1000NA may be disposed adjacent to the active region 1000A. The peripheral region 1000NA may surround the active region 1000A. According to an embodiment of the present disclosure, the peripheral region 1000NA may be omitted.

A thickness direction of the display device DD may be parallel to a third direction DR3 crossing the first direction DR1 and the second direction DR2. Accordingly, a front surface (or a top surface) and a rear surface (or a bottom surface) of members of the display device DD may be defined in the third direction DR3.

According to an embodiment of the present disclosure, the display device DD may be an emissive-type display. However, the present disclosure is not limited thereto. For example, the display device DD may be an organic light emitting display device, a quantum dot light emitting display device, a micro-light emitting diode (LED) display device, or a nano-LED display device. The light emitting layer of an organic light emitting display device may include an organic light emitting material. The light emitting layer of the quantum dot light emitting display device may include a quantum dot or a quantum rod. A light emitting layer of a micro-LED display device may include a micro-LED. A light emitting layer of a nano-LED display device may include a nano-LED.

FIG. 1 illustrates the display device DD serving as a portable terminal. The display device DD of FIG. 1 may be a bar type device having a substantially rectangular parallelepiped shape. The portable terminal may include a tablet, a personal computer (PC), a smartphone, a personal digital assistant (PDA), a portable multimedia player (PMP), a game console, or a wristwatch-type electronic device. However, the present disclosure is not limited thereto. The present disclosure may be used for small and medium-size display devices, such as a personal computer, a notebook computer, a kiosk, a car navigation unit, or a camera, in addition to large-size electronic equipment, such as a television or an outside billboard. These display devices are examples, and the display device may be applied to various other application without departing from the scope of the present disclosure.

Figure 2:
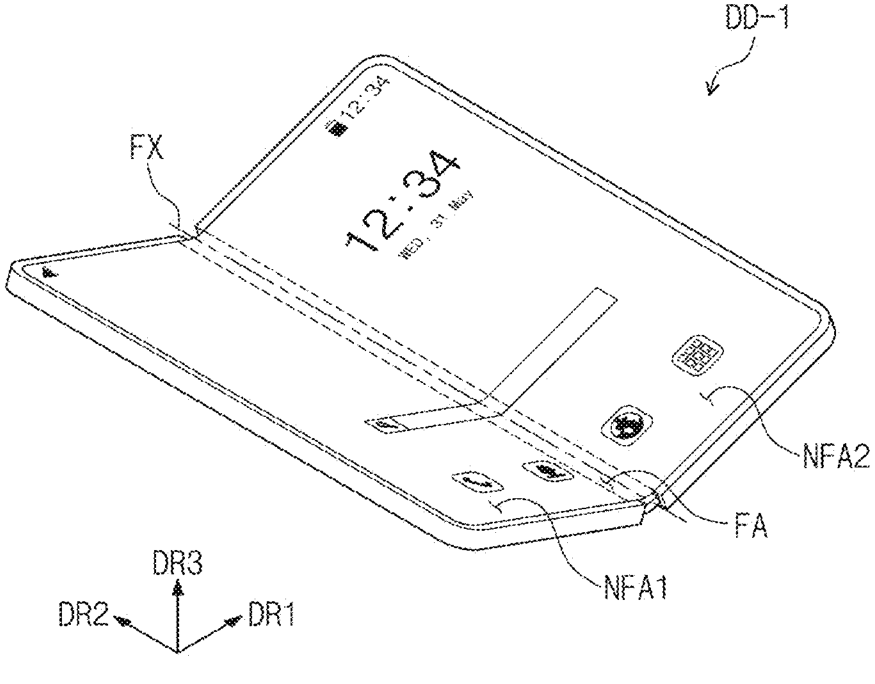
FIG. 2 is a perspective view of a display device according to an embodiment of the present disclosure.

FIG. 2 is a perspective view of a display device according to an embodiment of the present disclosure.

Referring to FIG. 2, a display device DD-1 may include a folding region FA and non-folding regions. The non-folding regions may include a first non-folding region NFA1 and a second non-folding region NFA2. The folding region FA may be interposed between the first non-folding region NFA1 and the second non-folding region NFA2.

As illustrated in FIG. 2, the folding region FA may be folded about a folding axis FX. The folding axis FX may be parallel to the second direction DR2. The folding region FA may have a specific curvature and a specific radius of curvature when the display device DD-1 is folded. The first non-folding region NFA1 and the second non-folding region NFA2 may face each other when the display device DD-1 is in a closed state, such that that the display surface is not exposed to the outside. For example, in the closed state, the display device DD-1 may be folded about the folding axis FX, and opposite edges of the first non-folding region NFA1 and the second non-folding region NFA2 may be brought together.

According to an embodiment of the present disclosure, the display device DD-1 may be in an open state such that the display surface is exposed to the outside. For example, in the open state, opposite edges the first non-folding region NFA1 and the second non-folding region NFA2 may be spaced apart from each other. According to an embodiment of the present disclosure, the display device DD-1 may be in the closed state or the open state. However, the present disclosure is not limited thereto.

Although FIG. 2 illustrates that a folding axis FX may be defined in the display device DD-1, the present disclosure is not limited thereto. For example, the display device DD-1 may include a plurality of folding axes defined therein, and may be the closed state or the open state from the unfolding state.

Although FIG. 1 and FIG. 2 illustrate that the display device DD in the bar type implementation and the display device DD-1 in a foldable type implementation, the present disclosure is not limited thereto. For example, the following description will be applied to various electronic devices such as a curved electronic device, a rollable electronic device, or a slidable electronic device.

Figure 3:
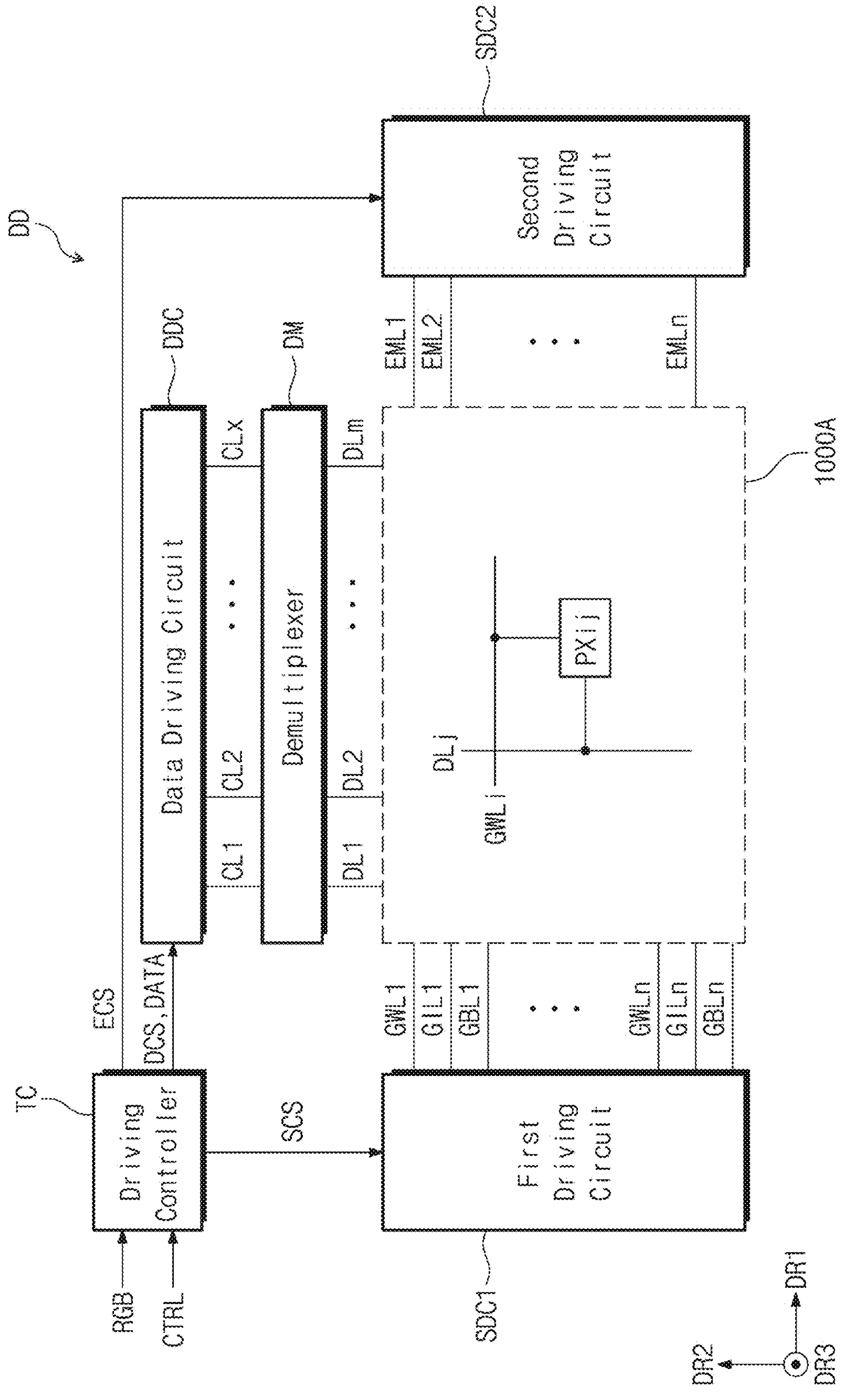
FIG. 3 is a block diagram of a display device according to an embodiment of the present disclosure.

FIG. 3 is a block diagram of a display device according to an embodiment of the present disclosure.

Referring to FIG. 3, the display device DD may include a driving controller TC, a data driving circuit DDC, a demultiplexer DM, a first driving circuit SDC1, a second driving circuit SDC2, and a pixel PXij disposed in the active region 1000A.

The display device DD may include a plurality of scan lines. For example, the display device DD may include first scan lines GWL1 to GWLn, second scan lines GIL1 to GILn, and third scan lines GBL1 to GBLn. The display device DD may include emission control lines EML1 to EMLn, and data lines DL1 to DLm. In this case, 'n' and 'm' are integers greater than 1.

The data lines DL1 to DLm may be connected to the demultiplexer DM. The data lines DL1 to DLm may be connected between the demultiplexer DM and the active region 1000A. The data lines DL1 to DLm may be arranged in the first direction DR1, and each of the data lines DL1 to DLm may extend in the second direction DR2.

The first scan lines GWL1 to GWLn may be connected to the first driving circuit SDC1. The first scan lines GWL1 to GWLn may be connected between the first driving circuit SDC1 and the active region 1000A. The first scan lines GWL1 to GWLn may be arranged in the second direction DR2, and each of the first scan lines GWL1 to GWLn may extend in the first direction DR1.

The second scan lines GIL1 to GILn may be connected to the first driving circuit SDC1. The second scan lines GIL1 to GILn may be connected between the first driving circuit SDC1 and the active region 1000A. The second scan lines GIL1 to GILn may be arranged in the second direction DR2, and each of the second scan lines GIL1 to GILn may extend in the first direction DR1.

The third scan lines GBL1 to GBLn may be connected to the first driving circuit SDC1. The third scan lines GBL1 to GBLn may be connected between the first driving circuit SDC1 and the active region 1000A. The third scan lines GBL1 to GBLn may be arranged in the second direction DR2, and each of the third scan lines GBL1 to GBLn may extend in the first direction DR1.

The emission control lines EML1 to EMLn may be connected to the second driving circuit SDC2. The emission control lines EML1 to EMLn may be connected between the second driving circuit SDC2 and the active region 1000A. The emission control lines EML1 to EMLn may be arranged in the second direction DR2, and each of the emission control lines EML1 to EMLn may extend in the first direction DR1.

The display device DD may include a plurality of pixels connected to the first scan lines GWL1 to GWLn, the second scan lines GIL1 to GILn, the third scan lines GBL1 to GBLn, the emission control lines EML1 to EMLn, and the data lines DL1 to DLm. By way of representation, FIG. 3 illustrates pixel PXij. Pixel PXij may be electrically connected to a first scan line GWLi among the first scan lines GWL1 to GWLn and a data line DLj among the data lines DL1 to DLm. Although FIG. 3 illustrates that the first scan line GWLi among the first scan lines GWL1 to GWLn is connected to the pixel PXij, the present disclosure is not limited thereto. For example, addition scan lines may be connected to the pixel PXij. Lines connected to the pixel PXij will be described herein.

The driving controller TC may receive an input image signal RGB and a control signal CTRL. The driving controller TC may generate an image data signal DATA. The image data signal DATA may be formed by transforming a data format of the image signal RGB to be matched with the interface specification with the data driving circuit DDC. In addition, the driving controller TC may generate a first control signal DCS for controlling the data driving circuit DDC, a second control signal SCS for controlling the first driving circuit SDC1, and a third control signal ECS for controlling the second driving circuit SDC2.

According to an embodiment of the present disclosure, the display device DD may further include channel lines CL1 to CLx. The channel lines CL1 to CLx may be connected between the data driving circuit DDC and the demultiplexer DM. The channel lines CL1 to CLx may be selectively electrically connected to the data lines DL1 to DLm through the demultiplexer DM. The number of channel lines CL1 to CLx may be less than the number of data lines DL1 to DLm. More generally, 'x' is an integer greater than '1' and less than 'm'. Although the demultiplexer DM is included in the display device DD by way of example, the present disclosure is not limited thereto. For example, the demultiplexer DM may be included in the data driving circuit DDC, implemented in the form of a separate integrated circuit, or integrated into a printed circuit board on which the data driving circuit DDC is mounted.

According to an embodiment of the present disclosure, the number of channels of data output from the data driving circuit DDC may be less than the number of data lines DL1 to DLm due to the demultiplexer DM. The number of channels may correspond to the number of channel lines CL1 to CLx. In this case, the number of integrated circuit (IC) chips including the data driving circuit DDC included in the display device DD may decrease as the number of channels decreases. In addition, as the number of channels of a single IC chip including the data driving circuit DDC decreases, the cost of the IC chip may decrease.

The data driving circuit DDC may receive a first control signal DCS and an image data signal DATA from the driving controller TC. The data driving circuit DDC may transform the image data signal DATA into data signals and may output the data signals to the channel lines CL1 to CLx. The data signals may be analog voltages corresponding to the grayscale value of the image data signal DATA. The demultiplexer DM may electrically connect some data lines among the data lines DL1 to DLm to the channel lines CL1 to CLx, and the data signals may be output to some data lines among the data lines DL1 to DLm.

The first driving circuit SDC1 may be connected to the first scan lines GWL1 to GWLn, the second scan lines GIL1 to GILn, and the third scan lines GBL1 to GBLn. The second driving circuit SDC2 may be connected to the emission control lines EML1 to EMLn. The first and second driving circuits SDC1 and SDC2 may receive the first and second control signals SCS and ECS from the driving controller TC, respectively, and may apply scan signals to the first scan lines GWL1 to GWLn, the second scan lines GIL1 to GILn, the third scan lines GBL1 to GBLn, and the emission control lines EML1 to EMLn, based on the first and second control signals SCS and ECS.

The scan signal may be set to a voltage for turning on transistors receiving the scan signal. For example, the scan signal applied to a P-type transistor may be set to be a logic low level, and the scan signal applied to an N-type transistor may be set to be a logic high level. Hereinafter, the meaning of "a scan signal is applied" or "a scan signal is activated" may be understood as a scan signal being applied in a logic level for turning on the transistor controlled by the scan signal.

According to an embodiment of the present disclosure, the first driving circuit SDC1 and the second driving circuit SDC2 may be spaced apart from each other, while the active region 1000A may be interposed between the first driving circuit SDC1 and the second driving circuit SDC2. However, the present disclosure is not limited thereto. For example, the first driving circuit SDC1 and the second driving circuit SDC2 may be disposed at a same side of the active region 1000A, or at least a portion of the first driving circuit SDC1 and the second driving circuit SDC2 may be disposed in the active region 1000A.

Figure 4:
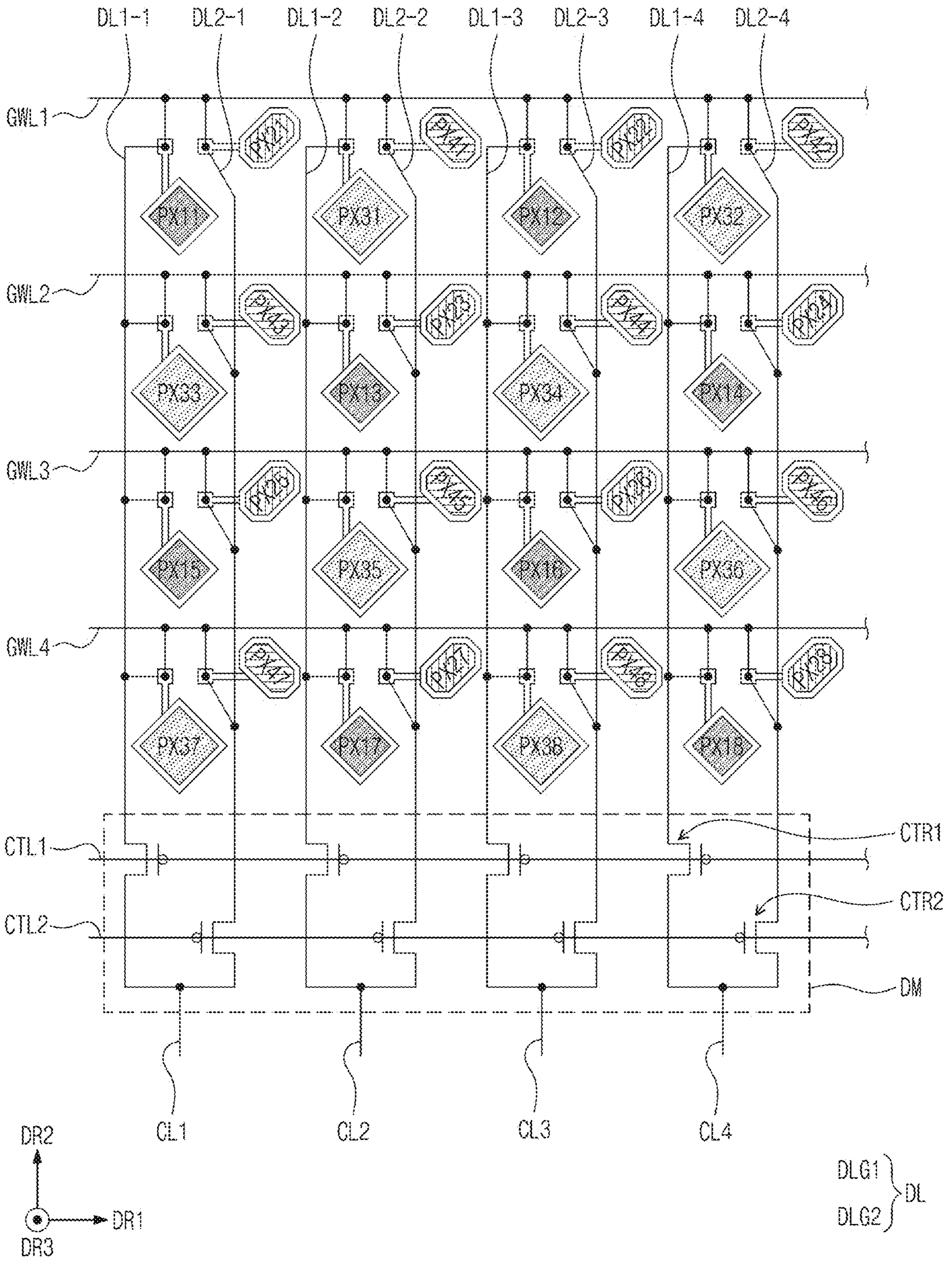
FIG. 4 is a conceptual view illustrating a portion of a display device according to an embodiment of the present disclosure.
Figure 5A:
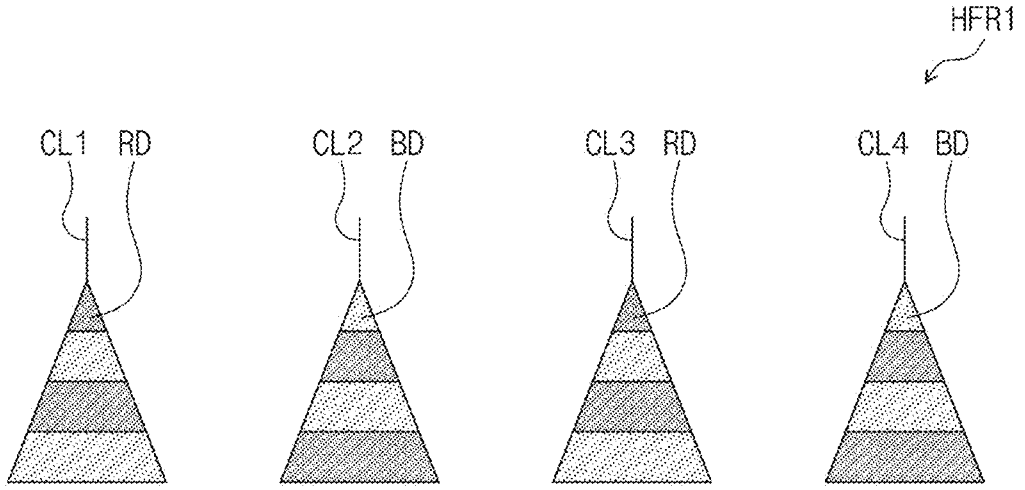
FIG. 5A and FIG. 5B are views illustrating the operation of a display device according to an embodiment of the present disclosure.
Figure 5B:
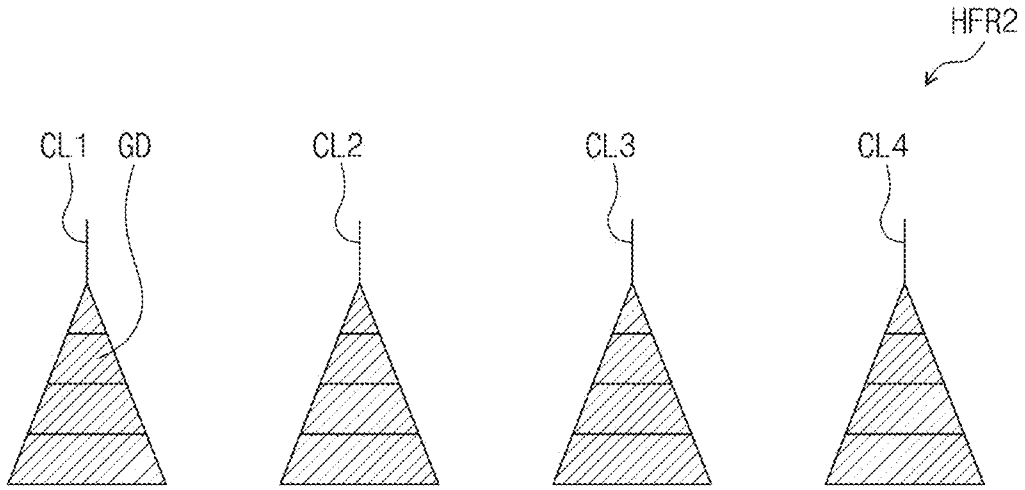

FIG. 4 is a conceptual view illustrating a portion of a display device according to an embodiment of the present disclosure. FIG. 5A and FIG. 5B are diagrams illustrating operations of a display device according to an embodiment of the present disclosure.

Referring to FIG. 4, four first scan lines GWL1, GWL2, GWL3, and GWL4, eight data lines DL, and 32 pixels PX11 to PX18, PX21 to PX28, PX31 to PX38, and PX41 to PX48 are illustrated. However, this is provided only for illustrative purposes, and the display device according to an embodiment of the present disclosure is not limited thereto.

The plurality of pixels PX11 to PX18, PX21 to PX28, PX31 to PX38, and PX41 to PX48 may include first pixels PX11, PX12, PX13, PX14, PX15, PX16, PX17, PX18, second pixels PX21, PX22, PX23, PX24, PX25, PX26, PX27, PX28, third pixels PX31, PX32, PX33, PX34, PX35, PX36, PX37, and PX38, and fourth pixels PX41, PX42, PX44, PX45, PX46, PX46, PX47, and PX48.

Each of the first pixels PX11 to PX18 may include a first emission region for outputting light having a first color. Each of the second pixels PX21 to PX28 may include a second emission region for outputting light having a second color different from the first color. Each of the third pixels PX31 to PX38 may include a third emission region for outputting light having a third color different from the first color and the second color. Each of the fourth pixels PX41 to PX48 may include a fourth emission region for outputting light having the second color. The first color may be red, the second color may be green, and the third color may be blue. The second pixels PX21 to PX28 and the fourth pixels PX41 to PX48 may output light having the second color.

As illustrated in FIG. 4, point hatching or comb hatching is illustrated in the first to fourth emission regions, respectively. The shapes of the second emission regions of the second pixels PX21 to PX28 and the shapes of the fourth emission regions of the fourth pixels PX41 to PX48 may be symmetrical to each other.

According to an embodiment of the present disclosure, the first emission regions and the third emissions regions may be repeatedly and alternately arranged in the first and second directions DR1 and DR2. The second emission regions and the fourth emission regions may be repeatedly and alternately arranged in the first and second directions DR1 and DR2. For example, the second emission region may be disposed within a region defined by two first emission regions and two third emission regions adjacent to each other.

Each of the plurality of pixels PX11 to PX18, PX21 to PX28, PX31 to PX38, and PX41 to PX48 may be electrically connected to a first scan line among the first scan lines GWL1, GWL2, GWL3, and GWL4 and a data line among the data lines DL. For example, the pixel PX11 may be connected to the scan line GWL1 and to the data line DL1-1.

The data lines DL may include first group data lines DLG1 and second group data lines DLG2. For example, when the data signal is applied to the first group data lines DLG1, the data signal may not be applied to the second group data lines DLG2. In addition, when the data signal is applied to the second group data lines DLG2, the data signal may not be applied to the first group data lines DLG1.

Four first group data lines DL1-1, DL1-2, DL1-3, and DL1-4 included in the first group data lines DLG1 and four second group data lines DL2-1, DL2-2, DL2-3, and DL2-4 included in the second group data lines DLG2 are illustrated. The first group data lines DL1-1, DL1-2, DL1-3, and DL1-4 and the second group data lines DL2-1, DL2-2, DL2-3, and DL2-4 may be alternately and repeatedly arranged.

The first and second group data lines DL1-1, DL1-2, DL1-3, DL1-4, DL2-1, DL2-2, DL2-3, and DL2-4 may be connected to the demultiplexer DM. The demultiplexer DM may include a plurality of first control transistors CTR1 connected in correspondence to the first group data lines DL1-1, DL1-2, DL1-3, and DL1-4, and a plurality of second control transistors CTR2 connected in correspondence to the second group data lines DL2-1, DL2-2, DL2-3, and DL2-4. For example, the demultiplexer DM may include a plurality of first control transistors CTR1 connected in one-to-one correspondence to the first group data lines DL1-1, DL1-2, DL1-3, and DL1-4, and a plurality of second control transistors CTR2 connected in one-to-one correspondence to the second group data lines DL2-1, DL2-2, DL2-3, and DL2-4.

The first control transistors CTR1 may be configured to be controlled by a first control signal CLA (see FIG. 9) applied through a first control line CTL1, and the second control transistors CTR2 may be configured to be controlled by a second control signal CLB (see FIG. 9) applied through a second control line CTL2.

The first pixel PX11, the second pixel PX21, the third pixel PX31, the fourth pixel PX41, the first pixel PX12, the second pixel PX22, the third pixel PX32, and the fourth pixel PX42 may be arranged in a first pixel row. The third pixel PX33, the fourth pixel PX43, the first pixel PX13, the second pixel PX23, the third pixel PX34, the fourth pixel PX44, the first pixel PX14, and the second pixel PX24 may be arranged in a second pixel row. The first pixel PX15, the second pixel PX25, the third pixel PX35, the fourth pixel PX45, the first pixel PX16, the second pixel PX26, the third pixel PX36, and the fourth pixel PX46 may be arranged in a third pixel row. The third pixel PX37, the fourth pixel PX47, the first pixel PX17, the second pixel PX27, the third pixel PX38, the fourth pixel PX48, the first pixel PX18, and the second pixel PX28 may be arranged in a fourth pixel row. The first to fourth pixel rows may extend in the first direction DR1 and may be sequentially arranged in the second direction DR2.

The pixels PX11, PX21, PX31, PX41, PX12, PX22, PX32, and PX42 disposed in the first pixel row may be connected to the (1-1)-th scan line GWL1. The pixels PX33, PX43, PX13, PX23, PX34, PX44, PX14, and PX24 disposed in the second pixel row may be connected to the (1-2)-th scan line GWL2. The pixels PX15, PX25, PX35, PX45 PX16, PX26, PX36, and PX46 disposed in the third pixel row may be connected to the (1-3)-th scan line GWL3. The pixels PX37, PX47, PX17, PX27, PX38, PX48, PX18, and PX28 disposed in the fourth pixel row may be connected to the (1-4)-th scan line GWL4. The (1-1)-th scan line GWL1, the (1-2)-th scan line GWL2, the (1-3)-th scan line GWL3, and the (1-4)-th scan line GWL4 may extend in the first direction DR1 and may be sequentially arranged in the second direction DR2.

According to an embodiment of the present disclosure, the plurality of pixels PX11 to PX18, PX21 to PX28, PX31 to PX38, and PX41 to PX48 may be divided into a plurality of first group pixels PX11 to PX18 and PX31 to PX38 connected to the first group data lines DL1-1, DL1-2, DL1-3, and DL1-4, and a plurality of second group pixels PX21 to PX28 and PX41 to PX48 connected to the second group data lines DL2-1, DL2-2, DL2-3, and DL2-4. The plurality of first group pixels PX11 to PX18 and PX31 to PX38 may be referred to as pixels arranged in odd-numbered columns, and a plurality of second group pixels PX21 to PX28 and PX41 to PX48 may be referred to as pixels arranged in even-numbered columns.

According to an embodiment of the present disclosure, the first group pixels PX11 to PX18 and PX31 to PX38 may include the first pixels PX11 to PX18 and the third pixels PX31 to PX38. The second group pixels PX21 to PX28 and PX41 to PX48 may include the second pixels PX21 to PX28 and the fourth pixels PX41 to PX48.

The first group data lines DL1-1, DL1-2, DL1-3, and DL1-4 may be connected to the first pixels PX11 to PX18 and the third pixels PX31 to PX38, and the second group data lines DL2-1, DL2-2, DL2-3, and DL2-4 may be connected to the second pixels PX21 to PX28 and the fourth pixels PX41 to PX48. For example, the first pixels PX11 and PX15, and the third pixels PX33 and PX37 may be connected to the first group data line DL1-1, and the second pixels PX21 and PX25 and the fourth pixels PX43 and PX47 may be connected to the second group data line DL2-1.

Figure 9:
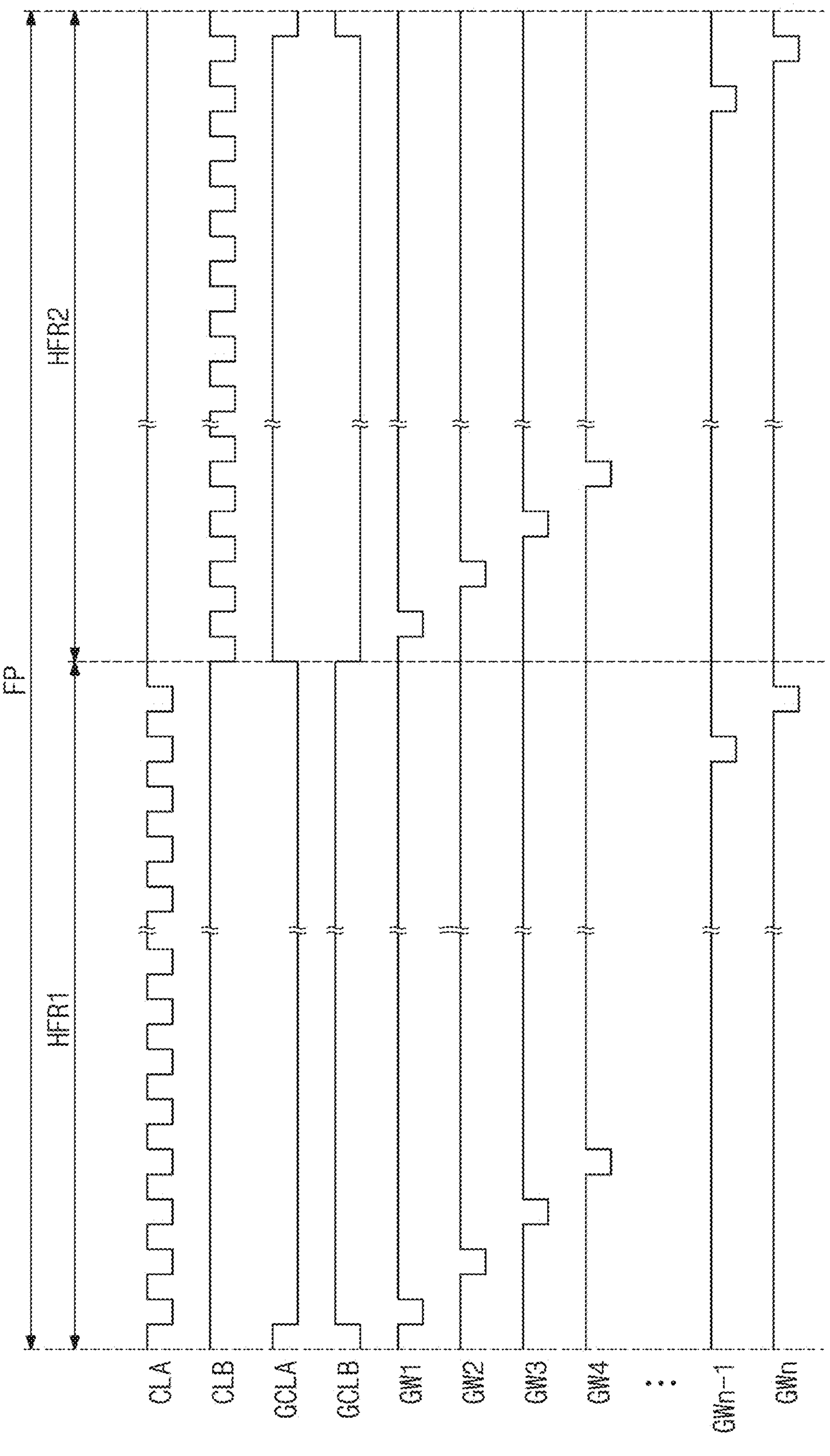
FIG. 9 is a timing diagram illustrating the operation of a display device according to an embodiment of the present disclosure.

Referring to FIG. 4 to FIG. 5B, the display device DD may operate in a unit of frame period FP (see FIG. 9). Data corresponding to a complete image may be applied to the pixels in a frame period FP (see FIG. 9). Accordingly, the first to fourth pixels PX11 to PX18, PX21 to PX28, PX31 to PX38, and PX41 to PX48 may emit light during one frame period FP. For example, all of the first to fourth pixels PX11 to PX18, PX21 to PX28, PX31 to PX38, and PX41 to PX48 may emit light during one frame period FP. The frame period FP (see FIG. 9) may include a first sub-frame period HFR1 and a second sub-frame period HFR2 subsequent to the first sub-frame period HFR1.

Referring to FIG. 4 and FIG. 5A, during the first sub-frame period HFR1, the first to fourth channel lines CL1, CL2, CL3, and CL4 may transmit a first color data signal RD, a third color data signal BD, a first color data signal RD, and a third color data signal BD to the first group data lines DL1-1, DL1-2, DL1-3, and DL1-4, respectively, in response to the first control signal CLA (see FIG. 9).

For example, during the first sub-frame period HFR1, the first channel line CL1 and the third channel line CL3 may alternately output the first color data signal RD and the third color data signal BD, respectively, and the second channel line CL2 and the fourth channel line CL4 may alternately output the third color data signal BD and the first color data signal RD. In other words, during the first sub-frame period HFR1, the display device DD (see FIG. 4) may display a first sub-image having a first color (e.g., red) and a third color (e.g., blue). For example, the first sub-image may have a magenta color.

Referring to FIG. 4 and FIG. 5B, each of the first to fourth channel lines CL1, CL2, CL3, and CL4 may transmit the second color data signal GD to the second group data lines DL2-1, DL2-2, DL2-3, and DL2-4 in response to the second control signal CLB (see FIG. 9), respectively, during the second sub-frame period HFR2. For example, each of the first to fourth channel lines CL1, CL2, CL3, and CL4 may output the second color data signal GD during the second sub-frame period HFR2. In other words, during the second sub-frame period HFR2, the display device DD may display the second sub-image having the second color (e.g., green).

The type of the color data signal output during a sub-frame period according to an embodiment of the present disclosure may be reduced. The type of the color data signal may include a data signal corresponding to red, a data signal corresponding to green, and a data signal corresponding to blue. Accordingly, a charging/discharging operation according to the change in the type of the color data signal may be reduced or eliminated, and power consumption of the data driving circuit DDC (see FIG. 3) may be reduced. For example, with respect to the change in the type of the color data signal, a change from a red data signal to a green data signal, or a change from a red data signal to a blue data signal may be made.

Figure 6:
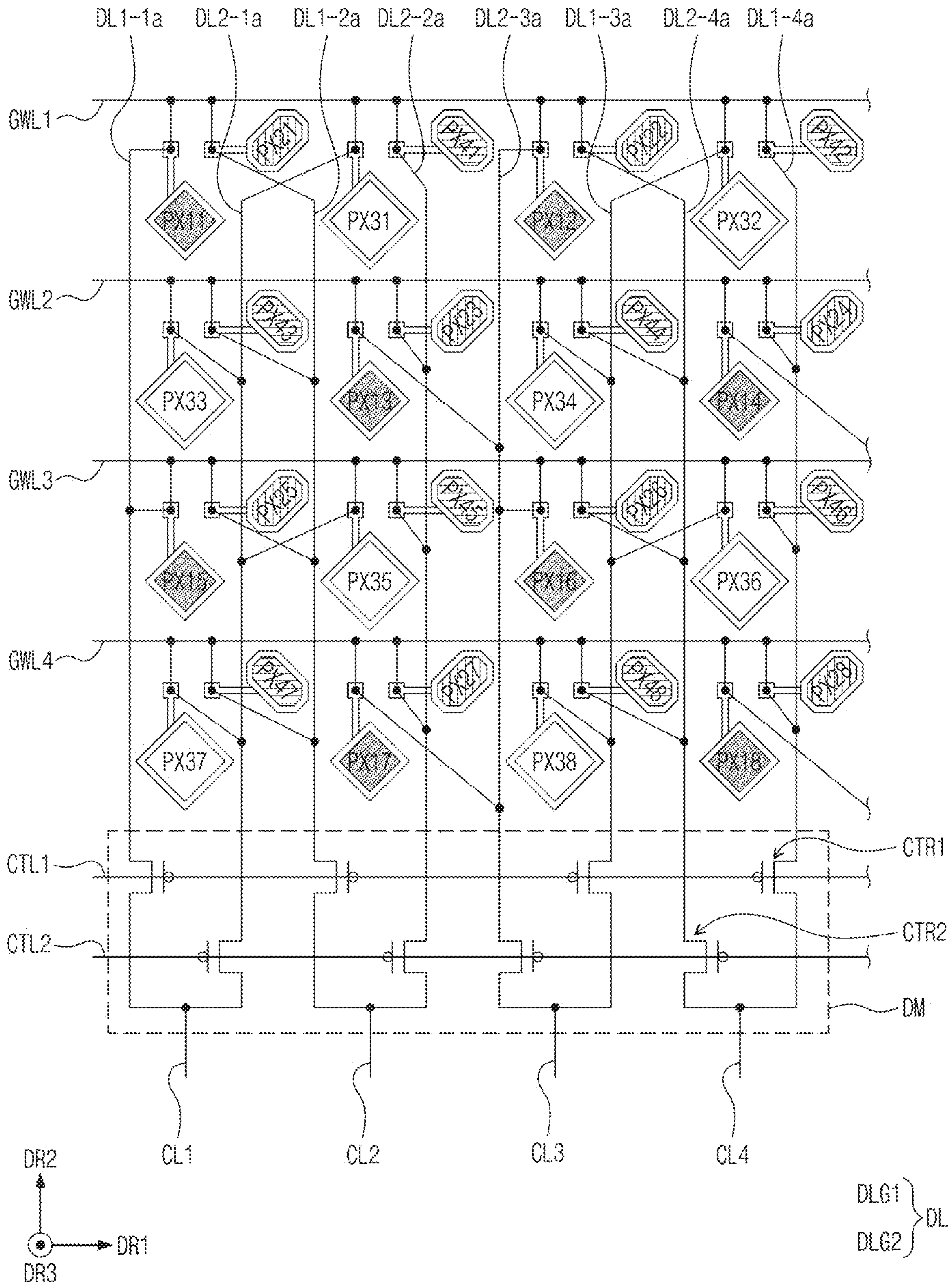
FIG. 6 is a conceptual view illustrating a portion of the display device according to an embodiment of the present disclosure.
Figure 7A:
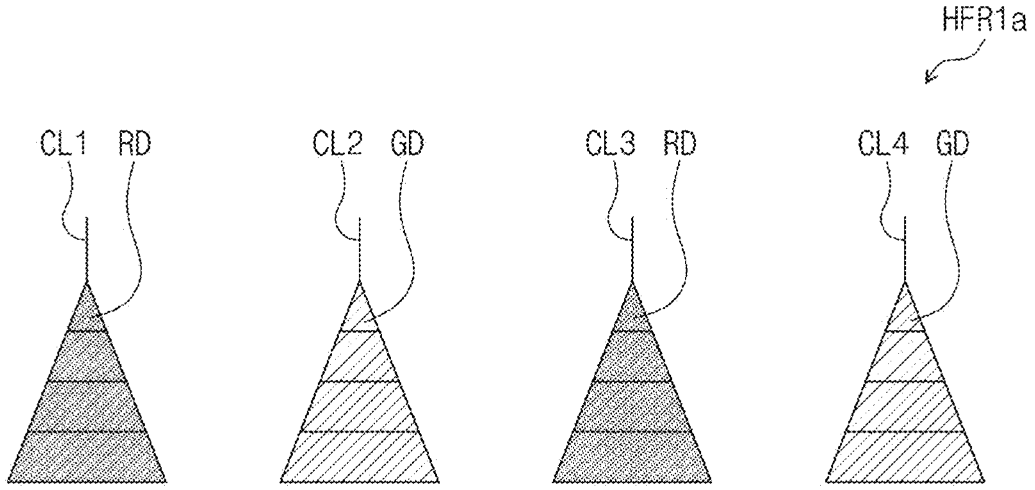
FIG. 7A and FIG. 7B are views illustrating operations of the display device according to an embodiment of the present disclosure
Figure 7B:
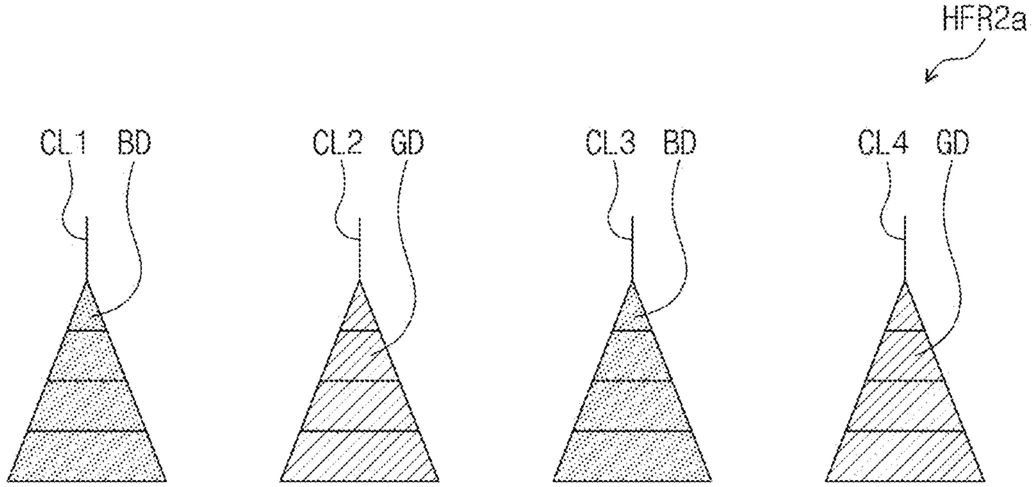

FIG. 6 is a conceptual view illustrating a portion of a display device according to an embodiment of the present disclosure, and FIG. 7A and FIG. 7B are views illustrating operations of the display device according to an embodiment of the present disclosure. In the following description made with reference to FIG. 6, where the same reference numerals are assigned to components described with reference to FIG. 4, and repetitive descriptions thereof may be omitted.

Referring to FIG. 6, first group data lines DL1-1*a*, DL1-2*a*, DL1-3*a*, and DL1-4*a* may include the (1-1)-th group data line DL1-1*a* connected to the first pixels PX11 and PX15, the (1-2)-th group data lines DL1-2*a* and DL1-4*a* connected to the second pixels PX21, PX24, PX25, and PX28 and the fourth pixels PX42, PX43, PX46, and PX477, and the (1-3)-th group data line DL1-3*a* connected to the third pixels PX32, PX34, PX36, and PX38.

Second group data lines DL2-1*a*, DL2-2*a*, DL2-3*a*, and DL2-4*a* may include the (2-1)-th group data line DL2-1*a* connected to the third pixels PX31, PX33, PX35, and PX37, the (2-2)-th group data lines DL2-2*a* and DL2-4*a* connected to the second pixels PX22, PX23, PX26, and PX27 and the fourth pixels PX41, PX44, PX45, and PX48, and the (2-3)-th group data line DL2-3*a* connected to the first pixels PX12, PX13, PX16, and PX17.

The (1-1)-th group data line DL1-1*a*, the (2-1)-th group data line DL2-1*a*, the (1-2)-th group data line DL1-2*a*, the (2-2)-th group data line DL2-2*a*, the (2-3)-th group data line DL2-3*a*, the (1-3)-th group data line DL1-3*a*, the (2-2)-th group data line DL2-4*a*, and the (1-2)-th group data line DL1-4*a* may extend in the second direction DR2 and may be sequentially arranged in the first direction DR1.

Referring to FIG. 6 and FIG. 7A, the first to fourth channel lines CL1, CL2, CL3, and CL4 may be electrically connected to the first group data lines DL1-1*a*, DL1-2*a*, DL1-3*a*, and DL1-4*a* in response to the first control signal CLA (see FIG. 9) during a first sub-frame period HFR1*a*. The first color data signals RD may be sequentially output through the first channel line CL1, the second color data signals GD may be sequentially output through each of the second and fourth channel lines CL2 and CL4, and the third color data signals BD may be sequentially output through the third channel line CL3. In other words, during the first sub-frame period HFR1*a*, the display device DD (see FIG. 3) may display a first sub-image having the first color (e.g., red), the second color (e.g., green), and the third color (e.g., blue).

Referring to FIG. 6 and FIG. 7B, the first to fourth channel lines CL1, CL2, CL3, and CL4 may be electrically connected to the second group data lines DL2-1*a*, DL2-2*a*, DL2-3*a*, and DL2-4*a* in response to the second control signal CLB (see FIG. 9) during a second sub-frame period HFR2*a*. The third color data signals BD may be sequentially output through the first channel line CL1, the second color data signals GD may be sequentially output through each of the second and fourth channel lines CL2 and CL4, and the first color data signals RD may be sequentially output through the third channel line CL3. In other words, during the second sub-frame period HFR2*a*, the display device DD (see FIG. 4) may display a second sub-image having the first color (e.g., red), the second color (e.g., green), and the third color (e.g., blue).

According to an embodiment of the present disclosure, a data signal applied to pixels having a same color may be applied to a channel line for each of the first and second sub-frame periods HFR1*a* and HFR2*a*. Therefore, a charging/discharging operation resulting from the change in the type of color data may be omitted, and power consumption of the data driving circuit DDC (see FIG. 3) may be reduced.

In addition, according to an embodiment of the present disclosure, a sub-image having the first color (e.g., red), the second color (e.g., green), and the third color (e.g., blue) may be displayed for each of the first and second sub-frame periods HFR1*a* and HFR2*a*. Accordingly, a probability of a color break-up phenomenon, in which a color difference between the first sub-frame period HFR1*a* and the second sub-frame period HFR2*a* may be perceived, may be reduced or eliminated.

Figure 8A:
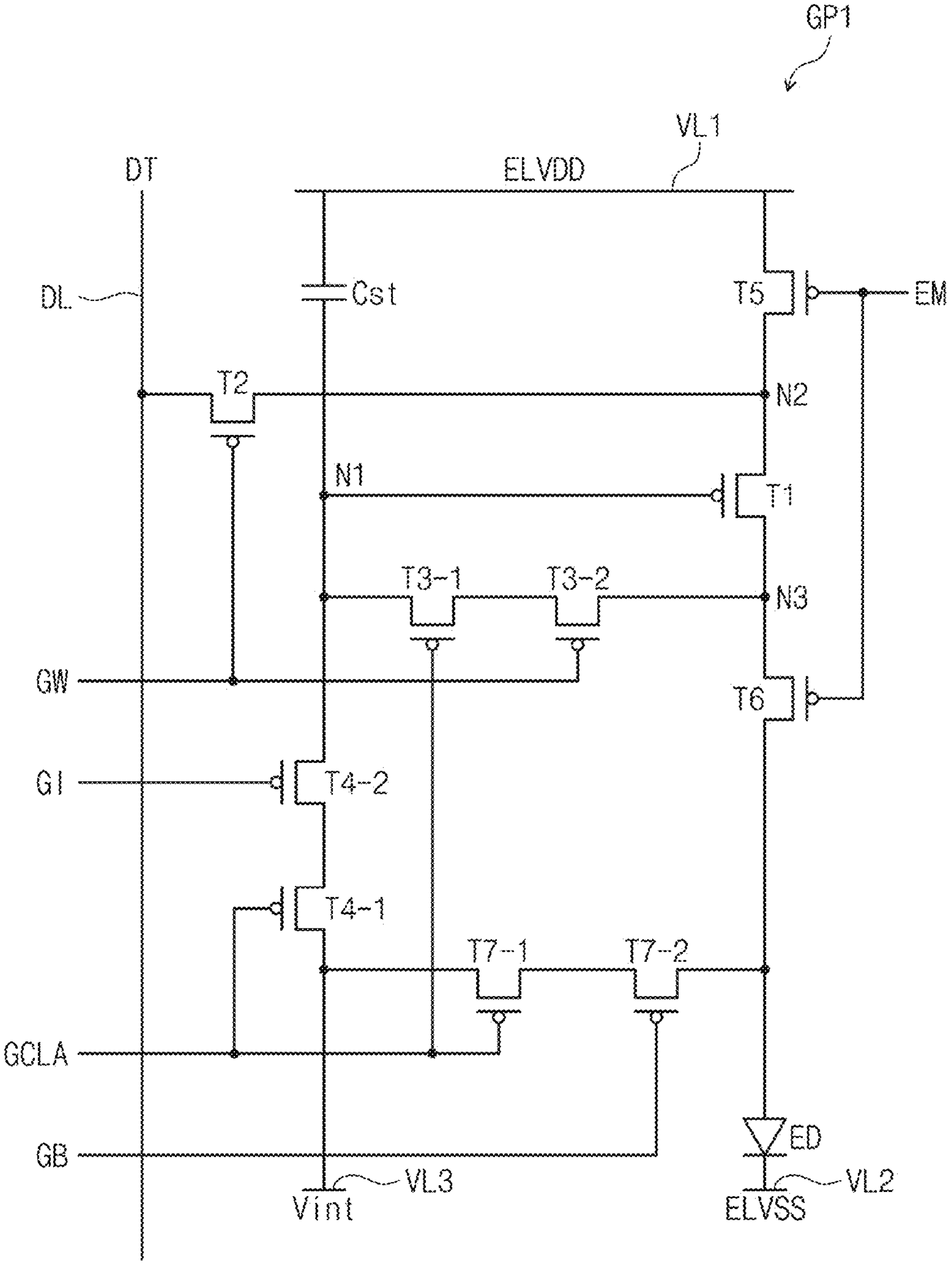
FIG. 8A is an equivalent circuit diagram of one of a plurality of first group pixels according to an embodiment of the present disclosure.

FIG. 8A is an equivalent circuit diagram of a pixel of a plurality of first group pixels according to an embodiment of the present disclosure.

Each of the plurality of pixels PXij (see FIG. 3) may have a 7T1C structure. The plurality of pixels PXij (see FIG. 3) may include a plurality of first group pixels PX11 to PX18 and PX31 to PX38 (see FIG. 4), and a plurality of second group pixels PX21 to PX28 and PX41 to PX48 (see FIG. 4).

FIG. 8A illustrates a first group pixel GP1 among a plurality of first group pixels PX11 to PX18 and PX31 to PX38 (see FIG. 4).

Referring to FIG. 3 and FIG. 8A, the first group pixel GP1 may include a light emitting element ED, first to seventh transistors T1, T2, T3, T4, T5, T6, and T7, and a capacitor Cst.

The light emitting element ED may be a light emitting diode. According to an embodiment of the present disclosure, the light emitting element ED may be an organic light emitting diode including an organic emission layer, but the present disclosure is not particularly limited thereto. The first group pixel GP1 may control an amount of current flowing through the light emitting element ED in response to a data signal DT. The light emitting element ED may emit light having specific brightness in response to the amount of current provided from a pixel circuit (e.g., the first group pixel GP1).

Each of the first to seventh transistors T1 to T7 may be a P-type transistor having a low-temperature polycrystalline silicon (LTPS) semiconductor layer. However, this is provided only for illustrative purposes, and the semiconductor layer according to an embodiment of the present disclosure is not limited thereto. For example, the semiconductor layer may include an oxide semiconductor or crystalline silicon. However, the present disclosure is provided only for illustrative purposes, and the first to seventh transistors T1 to T7 according to an embodiment of the present disclosure may be N-type transistors. According to an embodiment, at least one among the first to seventh transistors T1 to T7 may be P-type transistors, and the remaining transistors among the first to seventh transistors T1 to T7 may be N-type transistors.

The first transistor T1 may control the brightness of the light emitting element ED, and may be configured to include a semiconductor layer including polycrystalline silicon having high reliability, thereby implementing a high-resolution display device.

Each of the first scan lines GWL1 to GWLn may transmit a first scan signal GW. Each of the second scan lines GIL1 to GILn may transmit a second scan signal GI. Each of the third scan lines GBL1 to GBLn may transmit a third scan signal GB. Each of the emission control lines EML1 to EMLn may transmit an emission control signal EM. Each of the data lines DL1 to DLm may transmit the data signal DT. The data signal DT may have a voltage level corresponding to the image signal RGB (see FIG. 3).

A first power line VL1 may provide a first power supply voltage ELVDD to the first group pixel GP1. A second power line VL2 may provide a second power supply voltage ELVSS to the first group pixel GP1. An initialization voltage line VL3 may provide an initialization voltage Vint to the first group pixel GP1.

The first transistor T1 may be connected between the first power line VL1 for receiving the first power supply voltage ELVDD and the light emitting element ED. The first transistor T1 may include a first electrode connected to the first power line VL1 through the fifth transistor T5, a second electrode connected to a first electrode (or referred to as an anode electrode) of the light emitting element ED through the sixth transistor T6, and a gate electrode connected to an end of the capacitor Cst. The gate electrode of the first transistor T1 may be connected to a first node N1, the first electrode of the first transistor T1 may be connected to a second node N2, and the second electrode of the first transistor T1 may be connected to a third node N3. The first transistor T1 may receive the data signal DT through the data line DL, in response to a switching operation of the second transistor T2 and may apply a driving current to the light emitting element ED. The first transistor T1 may be referred to as a driving transistor.

The second transistor T2 may be connected between the data line DL and the first electrode of the first transistor T1. The second transistor T2 may include a first electrode connected to the data line DL, a second electrode connected to the second node N2, and a gate electrode for receiving the first scan signal GW. The second transistor T2 may be turned on according to the first scan signal GW to transmit the data signal DT, which may be received through the data line DL, to the first electrode of the first transistor T1.

Transistors T3-1 and T3-2 may be connected between the first node N1 and the third node N3. The third transistors T3-1 and T3-2 may include the (3-1)-th transistor T3-1 (or first-third transistor) and the (3-2)-th transistor T3-2 (or second-third transistor). The (3-1)-th transistor T3-1 and the (3-2)-th transistor T3-2 may be connected in series.

According to the present disclosure, the third transistors T3-1 and T3-2 may be configured in the form of a dual transistor. When the dual transistor is turned off, a leakage current may be reduced or removed. Accordingly, a display quality of the display device DD may be improved.

The transistor T3-1 may include a first electrode connected to the first node N1, a second electrode connected in series to the (3-2)-th transistor T3-2, and a gate electrode for receiving a first clock signal GCLA.

The transistor T3-2 may include a first electrode connected in series to the (3-1)-th transistor T3-1, a second electrode connected to the third node N3, and a gate electrode for receiving the first scan signal GW.

In other words, the first scan signal GW may be applied to one of the third transistors T3-1 and T3-2 of the first group pixel GP1, and the first clock signal GCLA may be applied to the remaining one of the third transistors T3-1 and T3-2. For example, the first scan signal GW may be applied to the (3-2)-th third transistor T3-2 and the first clock signal GCLA may be applied to the (3-1)-th third transistor T3-1.

The transistors T3-1 and T3-2 may be turned on in response to the first scan signal GW and the first clock signal GCLA to connect the gate electrode of the first transistor T1 to the second electrode of the first transistor T1, such that the first transistor T1 may be diode-connected.

The transistors T4-1 and T4-2 may be connected between the first node N1 and the initialization voltage line VL3 for receiving the initialization voltage Vint. The fourth transistors T4-1 and T4-2 may include the (4-1)-th transistor T4-1 and the (4-2)-th transistor T4-2. The (4-1)-th transistor T4-1 and the (4-2)-th transistor T4-2 may be connected in series.

According to the present disclosure, the fourth transistors T4-1 and T4-2 may be configured in the form of dual transistors. When the dual transistor is turned off, the leakage current may be reduced or removed. Accordingly, a display quality of the display device DD may be improved.

The (4-1)-th transistor T4-1 may include a first electrode connected to the initialization voltage line VL3, a second electrode connected in series to the (4-2)-th transistor T4-2, and a gate electrode for receiving the first clock signal GCLA.

The (4-2)-th transistor T4-2 may include a first electrode connected in series to the (4-1)-th transistor T4-1, a second electrode connected to the first node N1, and a gate electrode for receiving the second scan signal GI. However, this is provided only for illustrative purposes. For example, the first scan signal GW may be applied to the gate electrode of the (4-2)-th transistor T4-2, instead of the second scan signal GI, according to an embodiment of the present disclosure. For example, when an n-th first scan signal GW is applied to the gate electrode of the second transistor T2, the (n−1)-th first scan signal GW may be applied to the gate electrode of the (4-2)-th transistor T4-2.

In other words, the second scan signal GI may be applied to one of the fourth transistors T4-1 and T4-2 of the first group pixel GP1, and the first clock signal GCLA may be applied to the remaining one of the fourth transistors T4-1 and T4-2. For example, the second scan signal GI may be applied to the (4-2)-th fourth transistor T4-2 and the first clock signal GCLA may be applied to the (4-1)-th fourth transistor T4-1.

The fourth transistors T4-1 and T4-2 may be turned on in response to the second scan signal GI and the first clock signal GCLA to transmit an initialization voltage Vint to the first node N1, such that the potential of the gate electrode of the first transistor T1 may be initialized.

The transistor T5 may include a first electrode connected to the first power line VL1, a second electrode connected to the second node N2, and a gate electrode for receiving the emission control signal EM. The sixth transistor T6 may include a first electrode connected to the third node N3, a second electrode connected to the pixel electrode of the light emitting element ED, and a gate electrode for receiving the emission control signal EM.

The fifth and sixth transistors T5 and T6 may be simultaneously turned on in response to the emission control signal EM. The first power supply voltage ELVDD applied through the fifth transistor T5, which is turned on, may be compensated through the diode-connected first transistor T1, and the first power supply voltage ELVDD may be transmitted to the light emitting element ED through the sixth transistor T6.

The transistors T7-1 and T7-2 may be connected between the initialization voltage line VL3 and the light emitting element ED. The seventh transistors T7-1 and T7-2 may include the (7-1)-th transistor T7-1 and the (7-2)-th transistor T7-2. The (7-1)-th transistor T7-1 and the (7-2)-th transistor T7-2 may be connected in series.

According to the present disclosure, the seventh transistors T7-1 and T7-2 may be configured in the form of a dual transistor. When the dual transistor is turned off, the leakage current may be reduced or removed. Accordingly, a display quality of the display device DD may be improved.

The transistor T7-1 may include a first electrode connected to the initialization voltage line VL3, a second electrode connected to the (7-2)-th transistor T7-2 in series, and a gate electrode for receiving the first clock signal GCLA.

The transistor T7-2 may include a first electrode connected in series with the (7-1)-th transistor T7-1, a second electrode connected to the light emitting element ED, and a gate electrode for receiving the third scan signal GB. However, this is provided only for illustrative purposes. For example, the first scan signal GW may be applied to the gate electrode of the (7-2)-th transistor T7-2, instead of the third scan signal GB, according to an embodiment of the present disclosure.

In other words, the third scan signal GB may be applied to one of the seventh transistors T7-1 and T7-2 of the first group pixel GP1, and the first clock signal GCLA may be applied to a remaining one of the seventh transistors T7-1 and T7-2. For example, the third scan signal GB may be applied to the (7-2)-th seventh transistor T7-2 and the first clock signal GCLA may be applied to the (7-1)-th seventh transistor T7-1.

The transistors T7-1 and T7-2 may be turned on in response to the third scan signal GB and the first clock signal GCLA to transmit the initialization voltage Vint to the first electrode of the light emitting element ED, thereby initializing the potential of the anode electrode of the light emitting element ED.

A first end of the capacitor Cst may be connected to the first node N1 and a second end of the capacitor Cst may be connected to the first power line VL1. A second electrode (or referred to as a cathode electrode) of the light emitting element ED may be connected to the second power line VL2. The second power supply voltage ELVSS may have a lower voltage level than the first power supply voltage ELVDD.

Figure 8B:
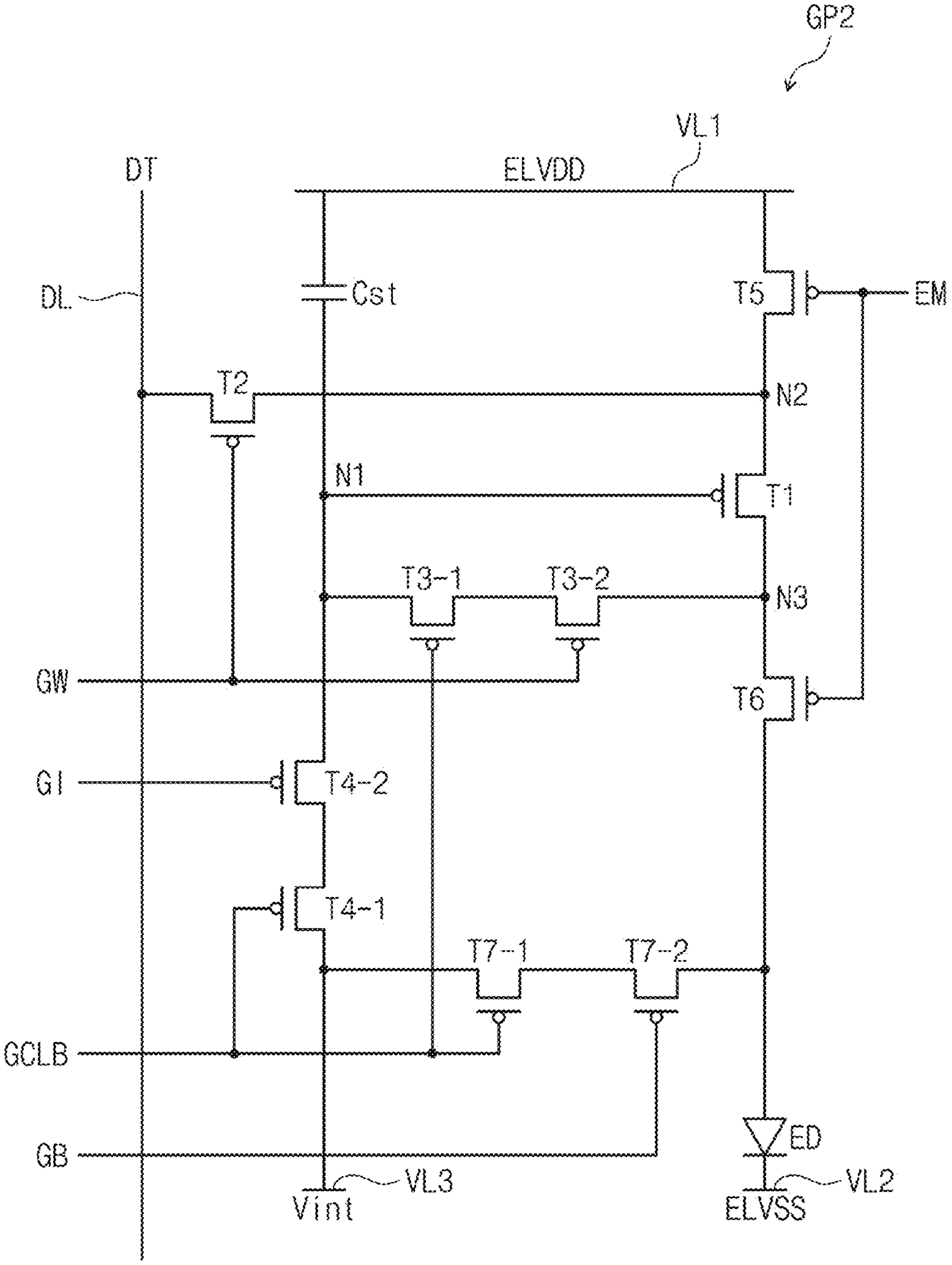
FIG. 8B is an equivalent circuit diagram of one of a plurality of second group pixels according to an embodiment of the present disclosure.

FIG. 8B is an equivalent circuit diagram of one of a plurality of second group pixels according to an embodiment of the present disclosure. In the following description made with reference to FIG. 8B, the same reference numerals will be assigned to components described with reference to FIG. 8A, and the repetitive descriptions may be omitted.

FIG. 8B illustrates one second group pixel GP2 among a plurality of second group pixels PX21 to PX28 and PX41 to PX48 (see FIG. 4).

Referring to FIG. 3 and FIG. 8B, the (3-1)-th transistor T3-1 may include a first electrode connected to the first node N1, a second electrode connected in series to the (3-2)-th transistor T3-2, and a gate electrode for receiving a second clock signal GCLB. The second clock signal GCLB may be different from the first clock signal GCLA (see FIG. 8A).

The (3-2)-th transistor T3-2 may include a first electrode connected in series to the (3-1)-th transistor T3-1, a second electrode connected to the third node N3, and a gate electrode for receiving the first scan signal GW.

In other words, the first scan signal GW may be applied to one of the third transistors T3-1 and T3-2 of the second group pixel GP2, and the second clock signal GCLB may be applied to a remaining one of the third transistors T3-1 and T3-2. For example, the first scan signal GW may be applied to the (3-2)-th third transistor T3-2 and the second clock signal GCLB may be applied to the (3-1)-th third transistor T3-1.

The (4-1)-th transistor T4-1 may include a first electrode connected to the initialization voltage line VL3, the second electrode connected in series to the (4-2)-th transistor T4-2, and the gate electrode for receiving the second clock signal GCLB.

The (4-2)-th transistor T4-2 may include the first electrode connected in series to the (4-1)-th transistor T4-1, the second electrode connected to the first node N1, and a gate electrode for receiving the second scan signal GI.

In other words, the second scan signal GI may be applied to one of the fourth transistors T4-1 and T4-2 of the second group pixel GP2, and the second clock signal GCLB may be applied to a remaining one of the fourth transistors T4-1 and T4-2. For example, the second scan signal GI may be applied to the (4-2)-th fourth transistor T4-2 and the second clock signal GCLB may be applied to the (4-1)-th fourth transistor T4-1.

The (7-1)-th transistor T7-1 may include the first electrode connected to the initialization voltage line VL3, the second electrode connected to the (7-2)-th transistor T7-2 in series, and a gate electrode receiving the second clock signal GCLB.

The (7-2)-th transistor T7-2 may include a first electrode connected in series to the (7-1)-th transistor T7, a second electrode connected to the light emitting element ED, and a gate electrode receiving the third scan signal GB.

In other words, the third scan signal GB may be applied to one of the seventh transistors T7-1 and T7-2 of the second group pixel GP2, and the second clock signal GCLB may be applied to a remaining one of the seventh transistors T7-1 and T7-2. For example, the third scan signal GB may be applied to the (7-2)-th seventh transistor T7-2 and the second clock signal GCLB may be applied to the (7-1)-th seventh transistor T7-1.

In other words, the second group pixel GP2 may receive the second clock signal GCLB and the first clock signal GCLA applied in the first group pixel GP1. The first clock signal GCLA and the second clock signal GCLB will be described herein.

FIG. 9 is a timing diagram illustrating an operation of a display device according to an embodiment of the present disclosure.

Referring to FIG. 4, FIG. 5A, FIG. 5B, FIG. 8A, FIG. 8B, and FIG. 9, during the first sub-frame period HFR1, the first control signal CLA may be alternately and repeatedly applied with an activation level and a deactivation level, and the second control signal CLB may have a deactivation level. Referring to the first control signal CLA and the second control signal CLB, the activation level may be a low level, and the deactivation level may be a high level.

During the first sub-frame period HFR1, the first clock signal GCLA may have an activation level, and the second clock signal GCLB may have a deactivation level. For example, in the first sub-frame period HFR1, the first clock signal GCLA may be transitioned to the activation level and the second clock signal GCLB may be transitioned to the deactivation level in response to an activation of the first control signal CLA in the first sub-frame period HFR1. The first clock signal GCLA may be held at the activation level and the second clock signal GCLB may be held at the deactivation level over multiple clock cycles of the first control signal CLA in the first sub-frame period HFR1. Referring to the first clock signal GCLA and the second clock signal GCLB, the activation level may be a low level, and the deactivation level may be a high level.

During the first sub-frame period HFR1, one of the third transistors T3-1 and T3-2 of the first group pixel GP1, one of the fourth transistors T4-1 and T4-2, and one of the seventh transistors T7-1 and T7-2 may be turned on in response to the first clock signal GCLA. For example, the (3-1)-th third transistor T3-1, the (4-1)-th fourth transistor T4-1, and the (7-1)-th seventh transistor T7-1 may be turned on in response to the first clock signal GCLA. The first group pixel GP1 may emit light of the light emitting element ED in response to the first scan signal GW during the first sub-frame period HFR1.

During the first sub-frame period HFR1, one of the third transistors T3-1 and T3-2, one of the fourth transistors T4-1 and T4-2 and one of the seventh transistors T7-1 and T7-2 may be turned off in the second group pixel GP2 in response to the second clock signal GCLB. For example, the (3-1)-th third transistor T3-1, the (4-1)-th fourth transistor T4-1, and the (7-1)-th seventh transistor T7-1 may be turned off in response to the second clock signal GCLB. The second group pixel GP2 may not emit light from the light emitting element ED during the first sub-frame period HFR1.

During the first sub-frame period HFR1, the plurality of first scan lines GWL1, GWL2, GWL3, and GWL4 may be sequentially activated. For example, the first scan signals GW1, GW2, GW3, GW4 to GWn−1, and GWn applied to the first scan lines GWL1 to GWLn may sequentially have an activation level (for example, a low level).

During the first sub-frame period HFR1, the data signal DT may be applied to the first group pixel GP1 connected to the first group data lines DL1-1, DL1-2, DL1-3, and DL1-4, among the first to fourth pixels PX11 to PX18, PX21 to PX28, PX31 to PX38, and PX41 to PX48.

During the second sub-frame period HFR2, the first control signal CLA may have the deactivation level, and the second control signal CLB may be alternately and repeatedly applied with the activation level and the deactivation level.

During the second sub-frame period HFR2, the second clock signal GCLB may have the activation level and the first clock signal GCLA may have the deactivation level. The activation period of the first clock signal GCLA may not overlap with the activation period of the second clock signal GCLB. That is, the activation period of the first clock signal GCLA may be in a non-overlap state with an activation period of the second clock signal GCLB. For example, the first clock signal GCLA may be transitioned to the deactivation level and the second clock signal GCLB may be transitioned to the activation level in response to an activation of the second control signal CLB in the second sub-frame period HFR2. The first clock signal GCLA may be held at the deactivation level and the second clock signal GCLB may be held at the activation level over multiple clock cycles of the second control signal CLB in the second sub-frame period HFR2.

During the second sub-frame period HFR2, one of the third transistors T3-1 and T3-2, one of the fourth transistors T4-1 and T4-2, and one of the seventh transistors T7-1 and T7-2 may be turned off in the first group pixel GP1 in response to the first clock signal GCLA. For example, the (3-1)-th third transistor T3-1, the (4-1)-th fourth transistor T4-1, and the (7-1)-th seventh transistor T7-1 may be turned off in response to the first clock signal GCLA. The first group pixel GP1 may not emit light from the light emitting element ED during the second sub-frame period HFR2.

During the second sub-frame period HFR2, one of the third transistors T3-1 and T3-2, one of the fourth transistors T4-1 and T4-2, and one of the seventh transistors T7-1 and T7-2 may be turned on in the second group pixel GP2 in response to the second clock signal GCLB. For example, the (3-1)-th third transistor T3-1, the (4-1)-th fourth transistor T4-1, and the (7-1)-th seventh transistor T7-1 may be turned on in response to the second clock signal GCLB. The second group pixel GP2 may emit light from the light emitting element ED in response to the first scan signal GW during the second sub-frame period HFR2.

During the second sub-frame period HFR2, the second gate lines GWL1, GWL2, GWL3, and GWL4 may be sequentially activated. For example, the first scan signals GW1, GW2, GW3, GW4 to GWn−1, and GWn applied to the first scan lines GWL1 to GWLn may sequentially have the activation level.

During the second sub-frame period HFR2, the data signal DT may be applied to the second group pixels PX21 to PX28 and PX41 to PX48, which are connected to the second group data lines DL2-1, DL2-2, DL2-3, and DL2-4, among the first to fourth pixels PX11 to PX18, PX21 to PX28, PX31 to PX38, and PX41 to PX48.

According to the present disclosure, the first group pixel GP1 and the second group pixel GP2 may be connected to a same first scan line GWLi (see FIG. 3). In some embodiments, a pixel area may be reduced, as compared to the case where the first group pixel GP1 and the second group pixel GP2 are connected to different scan lines. In some embodiments, a number of pixels arranged in the same area may increase. Accordingly, the display device DD (see FIG. 1) may be implemented with a high resolution.

In a comparative embodiment, when the first group pixel GP1 and the second group pixel GP2 are connected to different first scan lines, a plurality of first driving circuits SDC1 may be provided to output the first scan signal GW to drive the first group pixel GP1 and the second group pixel GP2, respectively. According to an embodiment of the present disclosure, the first scan signal GW may be provided using a first driving circuit SDC1. The first group pixel GP1 and the second group pixel GP2 may be separately driven through the first clock signal GCLA and the second clock signal GCLB. Accordingly, the display device DD (see FIG. 1) may be provided with the area reduced in the peripheral region 1000NA (see FIG. 1).

In addition, according to an embodiment of the present disclosure, the first scan signal GW may be provided by using a first driving circuit SDC1. In this case, an amount of power consumed in the first driving circuit SDC1 may be reduced as compared to an amount of power consumed when the first scan signal GW is individually applied to the first group pixel GP1 and the second group pixel GP2 to drive the first group pixel GP1 and the second group pixel GP2. Accordingly, power consumption of the display device DD (see FIG. 1) may be reduced.

Figure 10A:
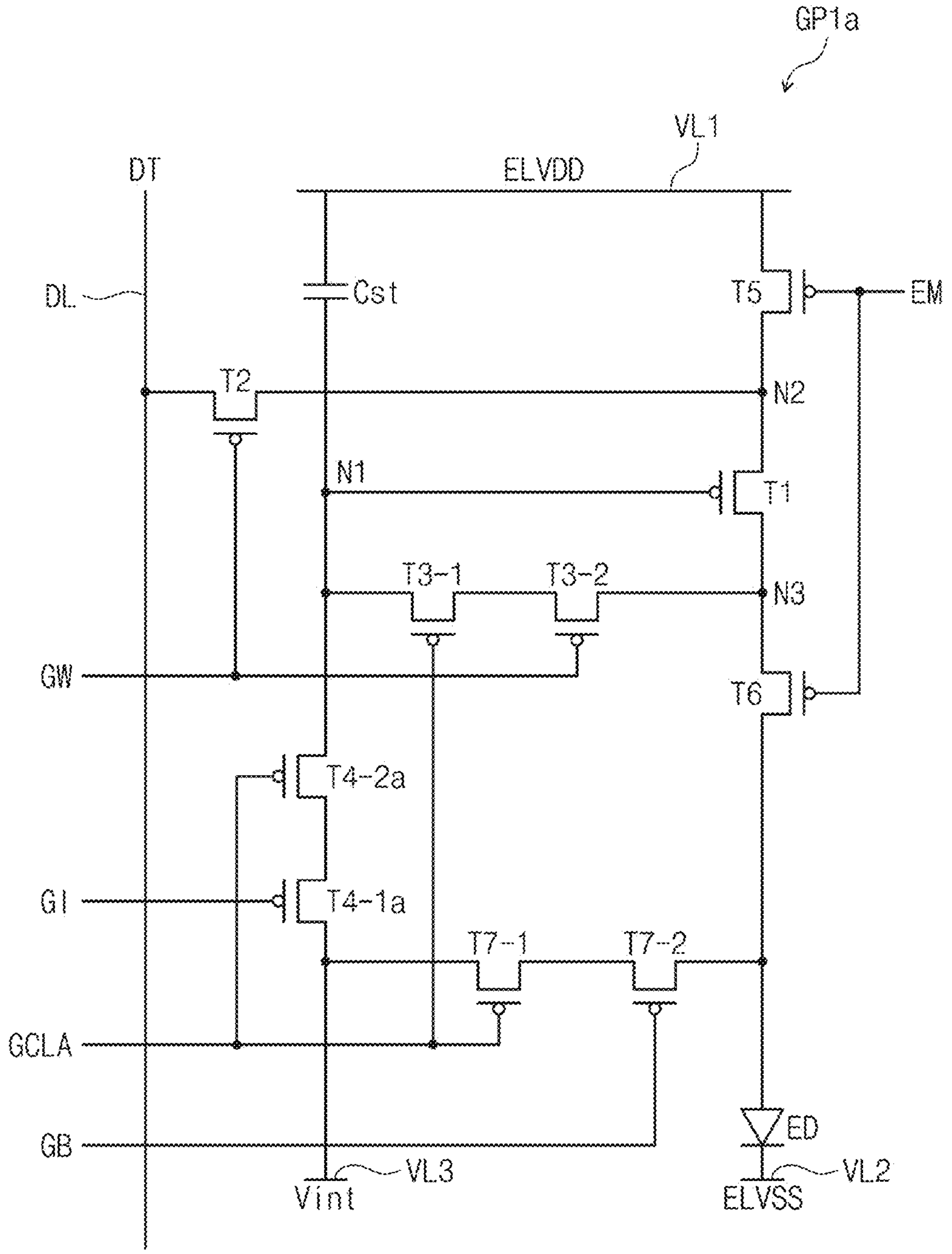
FIG. 10A is an equivalent circuit diagram of one of a plurality of first group pixels according to an embodiment of the present disclosure.
Figure 10B:
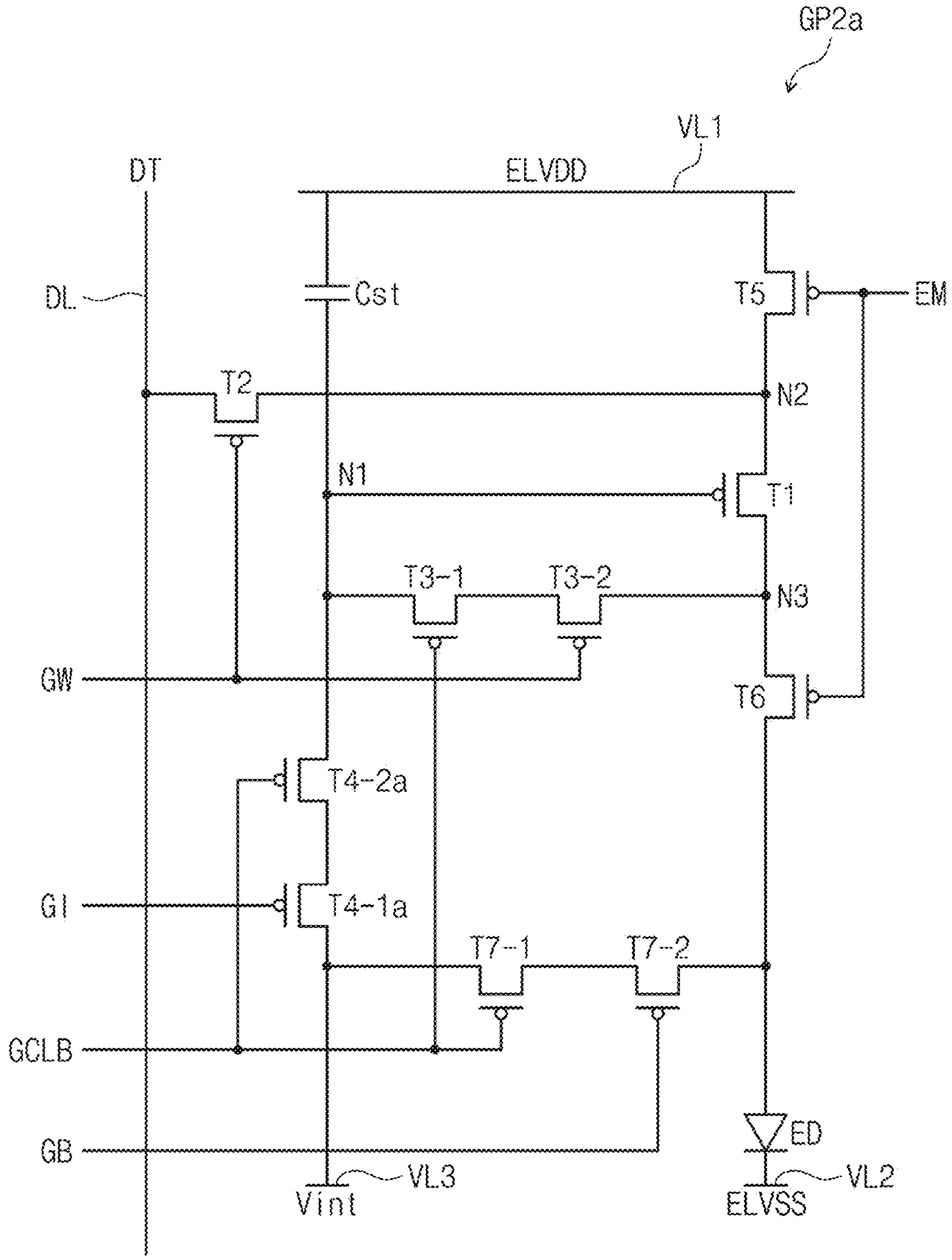
FIG. 10B is an equivalent circuit diagram of one of a plurality of second group pixels according to an embodiment of the present disclosure.

FIG. 10A is an equivalent circuit diagram of a first group pixel according to an embodiment of the present disclosure. FIG. 10B is an equivalent circuit diagram of a second group pixel according to an embodiment of the present disclosure. In the following description made with reference to FIG. 10A and FIG. 10B, the same reference numerals will be assigned to components described with reference to FIG. 8A and FIG. 8B, and the repetitive descriptions thereof may be omitted.

Referring to FIG. 10A and FIG. 10B, a first group pixel GP1*a* and a second group pixel GP2*a* may include the first to seventh transistors T1, T2, T3-1, T3-2, T4-1*a*, T4-2*a*, T5, T6, T7-1, and T7-2, the capacitor Cst, and the light emitting element ED.

The (4-1)-th transistor T4-1*a* may include a first electrode connected to the initialization voltage line VL3, a second electrode connected in series to the (4-2)-th transistor T4-2*a*, and a gate electrode receiving a second scan signal GI.

The (4-2)-th transistor T4-2*a* may include a first electrode connected in series to the (4-1)-th transistor T4-1*a*, a second electrode connected to the first node N1, and a gate electrode.

The first clock signal GCLA may be applied to the gate electrode of the (4-2)-th transistor T4-2*a* of the first group pixel GP1*a*, and the second clock signal GCLB may be applied to the gate electrode of the (4-2)-th transistor T4-2*a* of the second group pixel GP2*a*.

Figure 11A:
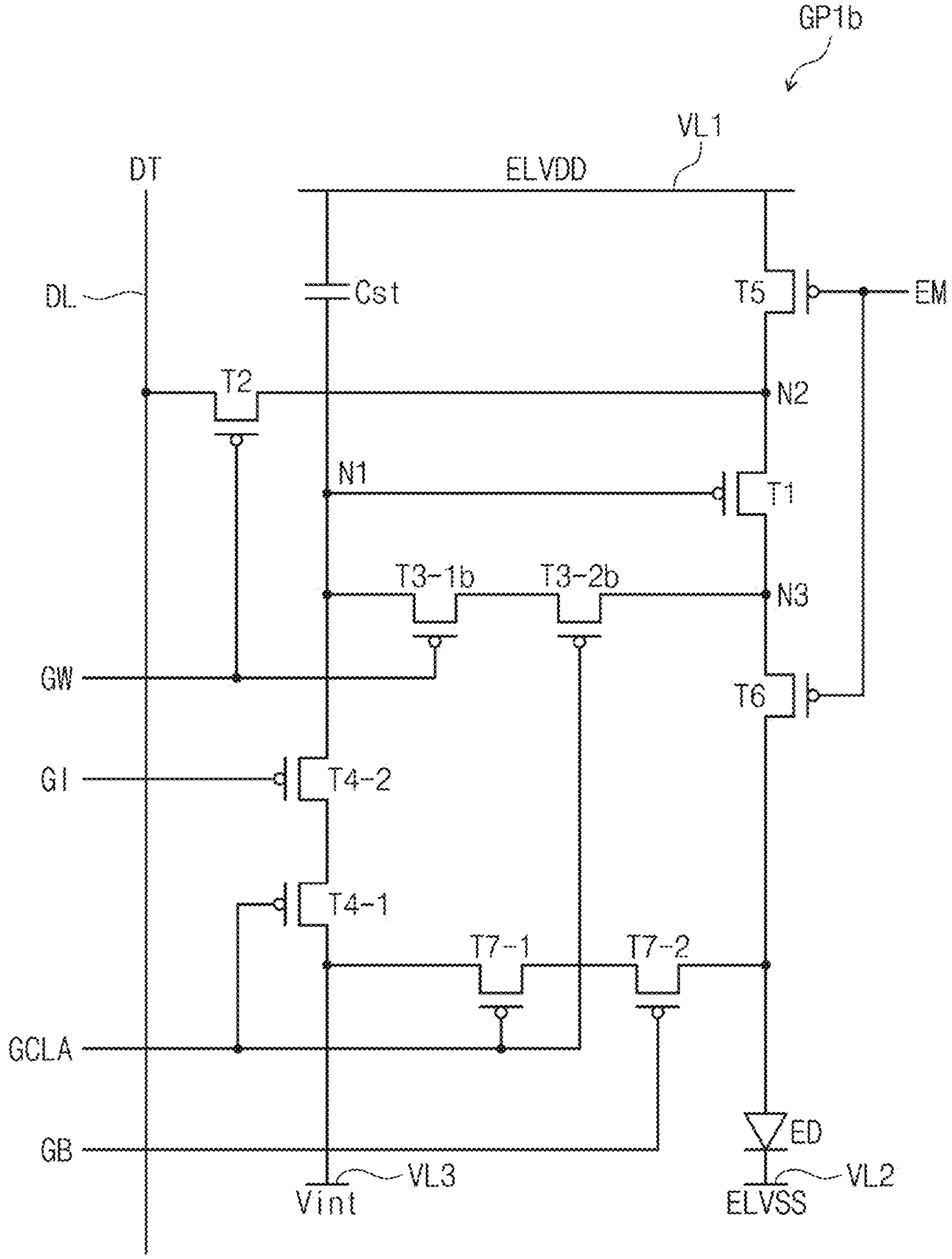
FIG. 11A is an equivalent circuit diagram of one of a plurality of first group pixels according to an embodiment of the present disclosure.
Figure 11B:
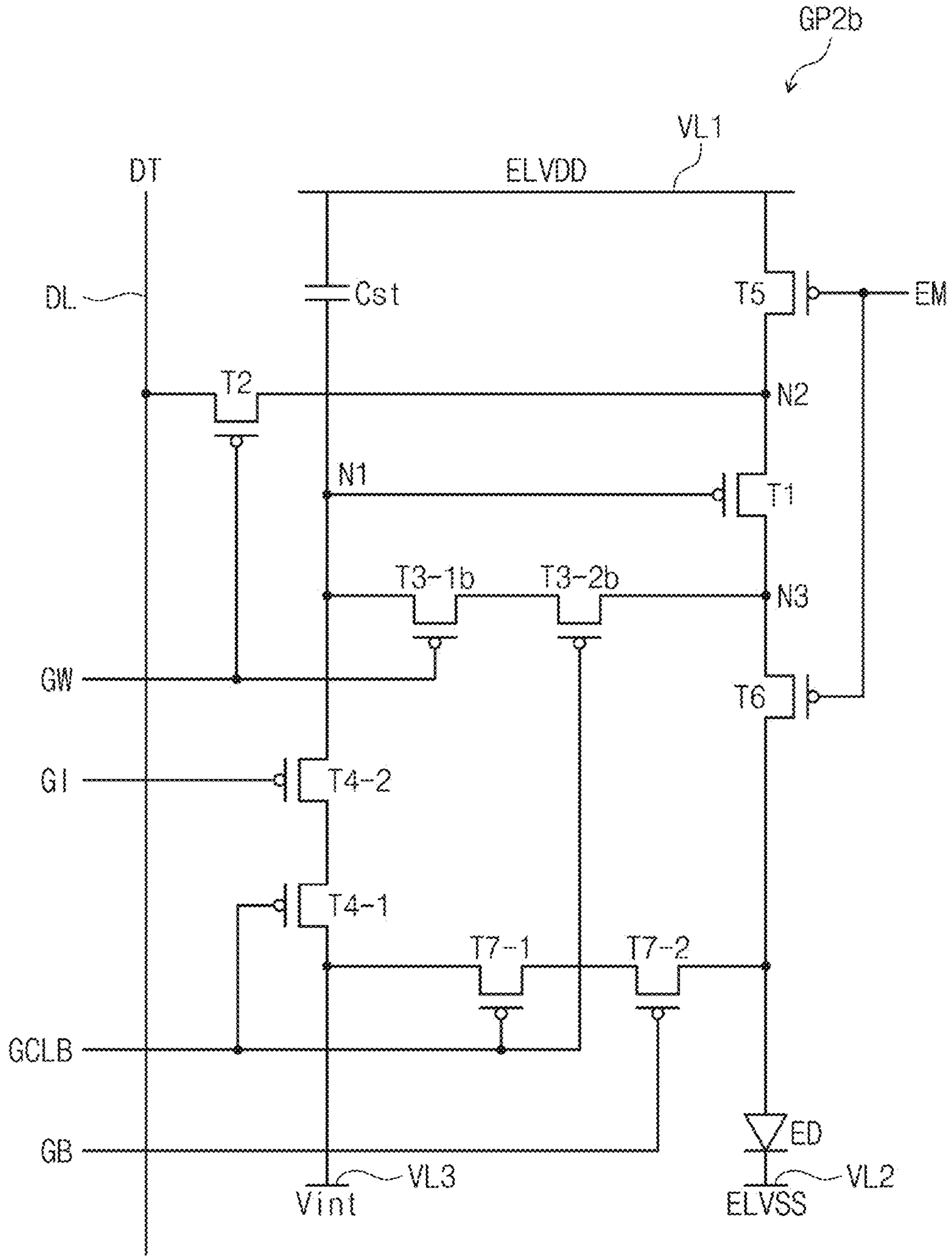
FIG. 11B is an equivalent circuit diagram of one of a plurality of second group pixels according to an embodiment of the present disclosure.

FIG. 11A is an equivalent circuit diagram of a first group pixel according to an embodiment of the present disclosure. FIG. 11B is an equivalent circuit diagram of a second group pixel according to an embodiment of the present disclosure. In the following description made with reference to FIG. 11A and FIG. 11B, the same reference numerals are assigned to components described with reference to FIG. 8A and FIG. 8B, and repetitive descriptions thereof may be omitted.

Referring to FIG. 11A and FIG. 11B, a first group pixel GP1*b* and a second group pixel GP2*b* may include first to seventh transistors T1, T2, T3-1*b*, T3-2*b*, T4-1, T4-2, T5, T6, T7-1, and T7-2, the capacitor Cst, and the light emitting element ED.

The (3-1)-th transistor T3-1*b* may include a first electrode connected to the first node N1, a second electrode connected in series to the (3-2)-th transistor T3-2*b*, and a gate electrode receiving the first scan signal GW.

The (3-2)-th transistor T3-2*b* may include a first electrode connected in series to the (3-1)-th transistor T3-1*b*, a second electrode connected to the third node N3, and a gate electrode.

The first clock signal GCLA may be applied to the gate electrode of the (3-2)-th transistor T3-2*b* of the first group pixel GP1*a*, and the second clock signal GCLB may be applied to the gate electrode of the (3-2)-th transistor T3-2*b* of the second group pixel GP2*a*.

Figure 12A:
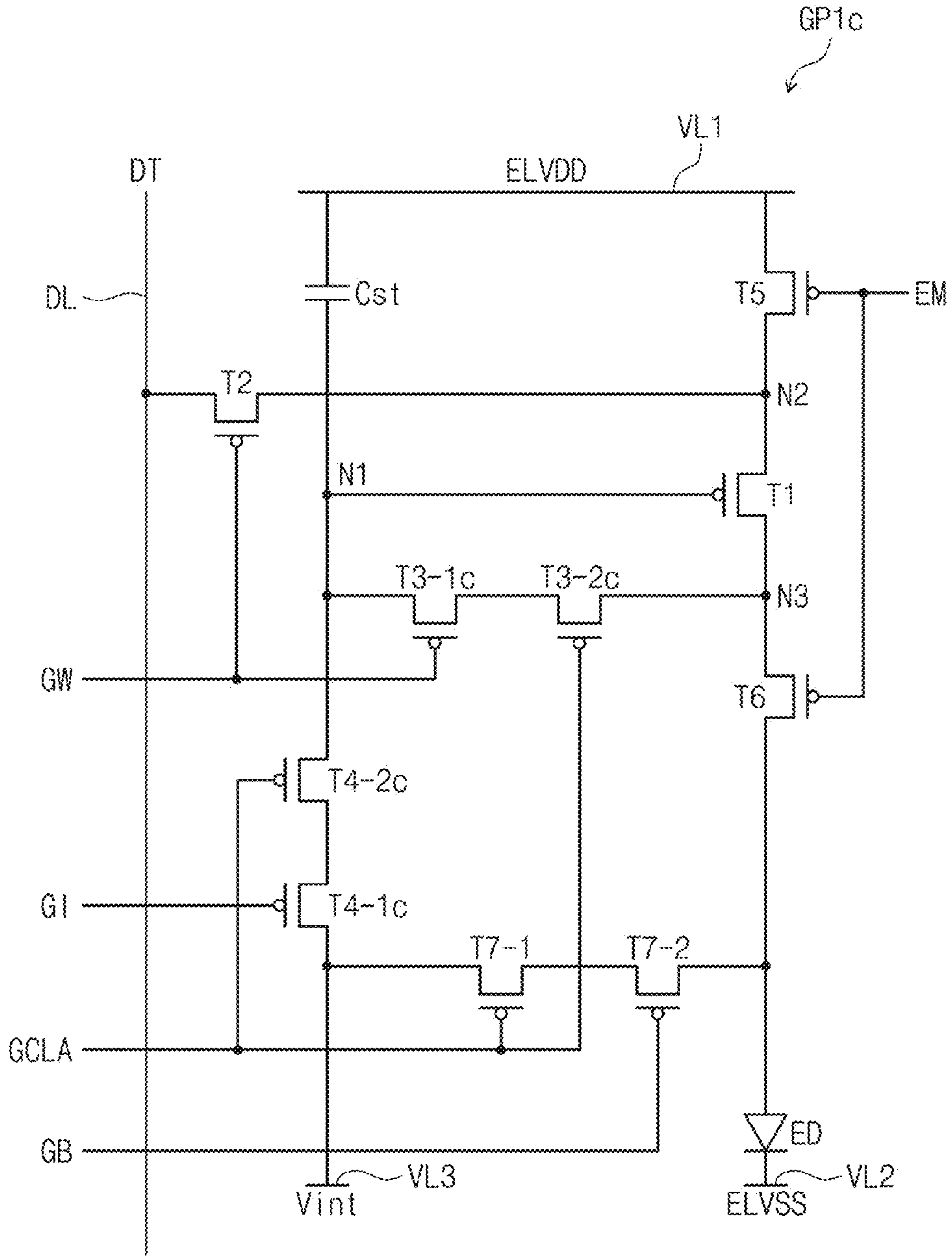
FIG. 12A is an equivalent circuit diagram of one of a plurality of first group pixels according to an embodiment of the present disclosure.
Figure 12B:
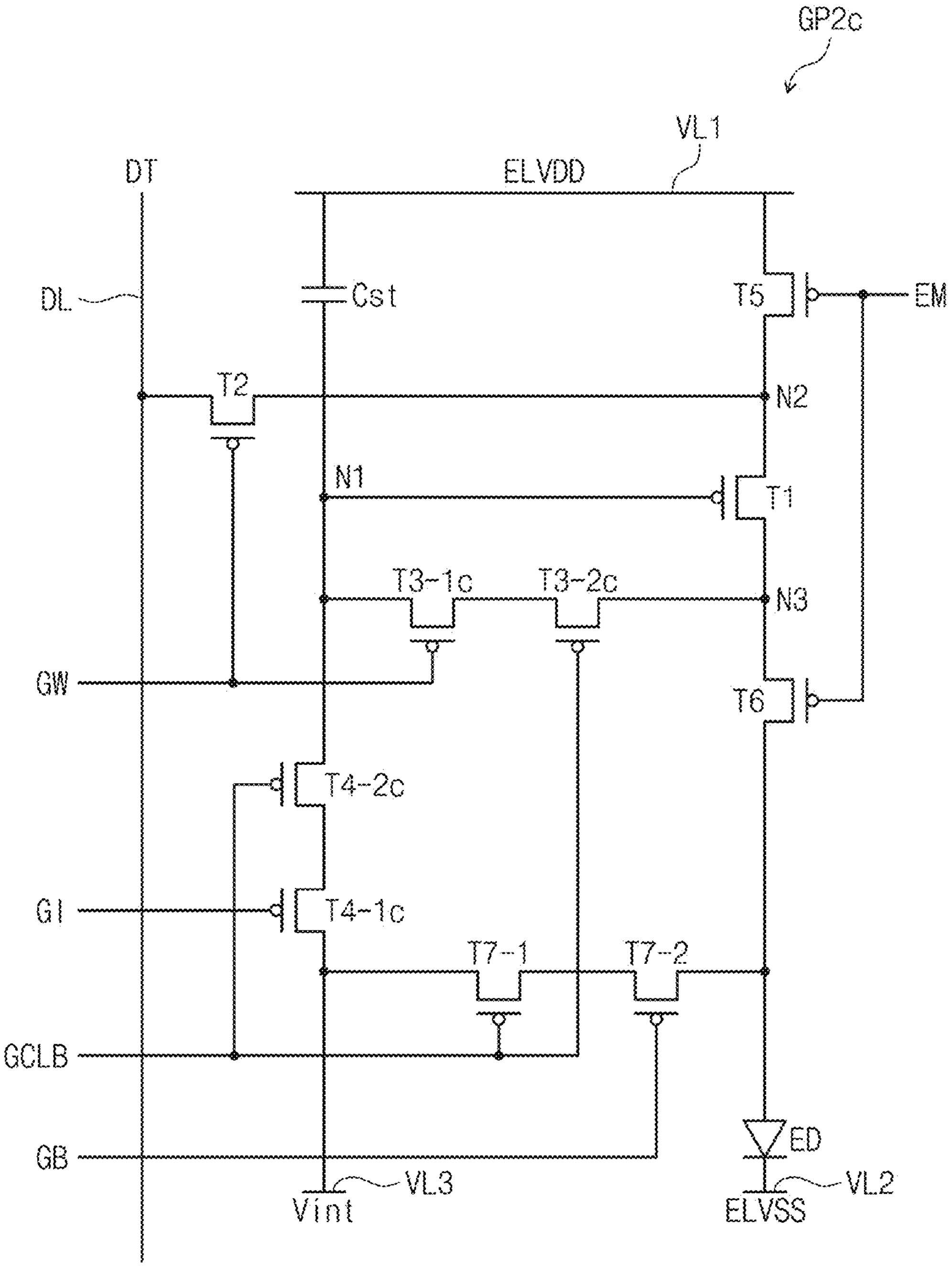
FIG. 12B is an equivalent circuit diagram of one of a plurality of second group pixels according to an embodiment of the present disclosure.

FIG. 12A is an equivalent circuit diagram of a first group pixel according to an embodiment of the present disclosure. FIG. 12B is an equivalent circuit diagram of a second group pixel according to an embodiment of the present disclosure. In the following description made with reference to FIG. 12A and FIG. 12B, the same reference numerals will be assigned to components described with reference to FIG. 8A and FIG. 8B, and repetitive descriptions thereof may be omitted.

Referring to FIG. 12A and FIG. 12B, a first group pixel GP1*c* and a second group pixel GP2*c* may include the first to seventh transistors T1, T2, T3-1*c*, T3-2*c*, T4-1*c*, T4-2*c*, T5, T6, T7-1, and T7-2, the capacitor Cst, and the light emitting element ED.

The (3-1)-th transistor T3-1*c* may include a first electrode connected to the first node N1, a second electrode connected in series to the (3-2)-th transistor T3-2*c*, and a gate electrode receiving the first scan signal GW.

The (3-2)-th transistor T3-2*c* may include a first electrode connected in series to the (3-1)-th transistor T3-1*c*, a second electrode connected to the third node N3, and a gate electrode.

The first clock signal GCLA may be applied to the gate electrode of the (3-2)-th transistor T3-2*c* of the first group pixel GP1*c*, and the second clock signal GCLB may be applied to the gate electrode of the (3-2)-th transistor T3-2*c* of the second group pixel GP2*c*.

The (4-1)-th transistor T4-1*c* may include a first electrode connected to the initialization voltage line VL3, a second electrode connected in series to the (4-2)-th transistor T4-2*c*, and a gate electrode for receiving the second scan signal GI.

The (4-2)-th transistor T4-2*c* may include a first electrode connected in series to the (4-1)-th transistor T4-1*c*, a second electrode connected to the first node N1, and a gate electrode.

Figure 13A:
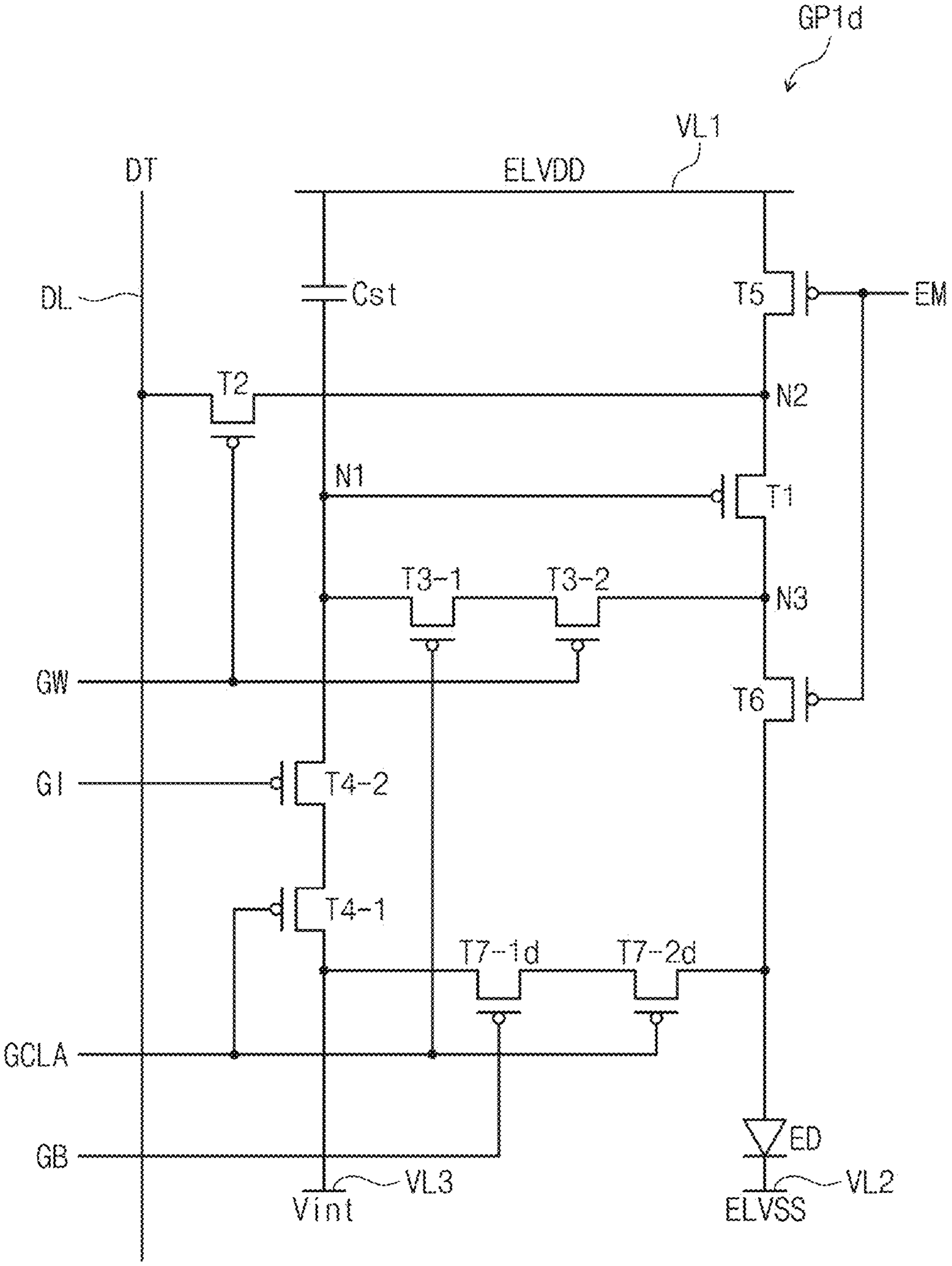
FIG. 13A is an equivalent circuit diagram of one of a plurality of first group pixels according to an embodiment of the present disclosure.
Figure 13B:
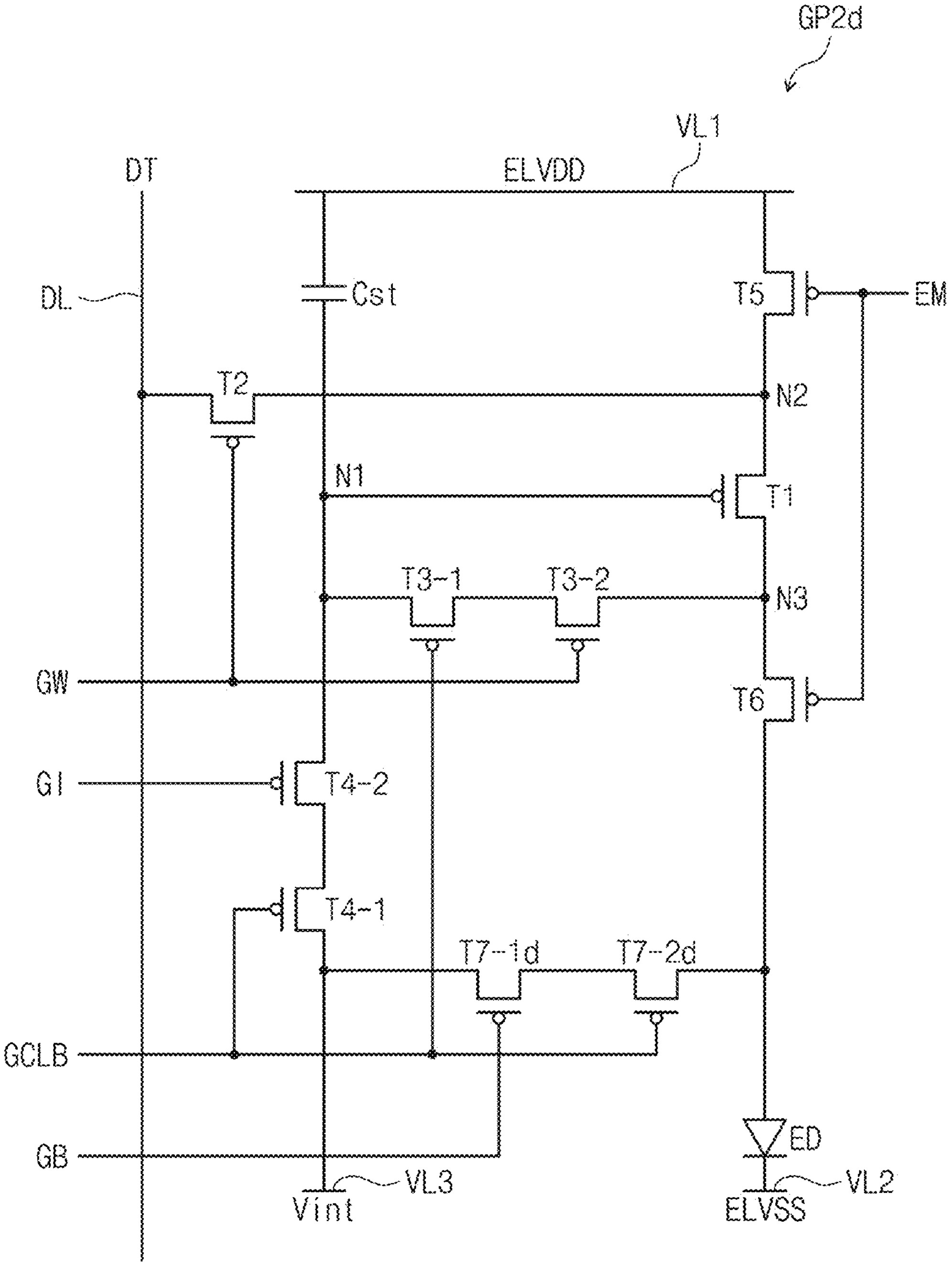
FIG. 13B is an equivalent circuit diagram of one of a plurality of second group pixels according to an embodiment of the present disclosure.

The first clock signal GCLA may be applied to the gate electrode of the (4-2)-th transistor T4-2*c* of the first group pixel GP1*c*, and the second clock signal GCLB may be applied to the gate electrode of the (4-2)-th transistor T4-2*c* of the second group pixel GP2*c*. FIG. 13A is an equivalent circuit diagram of a first group pixel according to an embodiment of the present disclosure. FIG. 13B is an equivalent circuit diagram of a second group pixel according to an embodiment of the present disclosure. In the following description made with reference to FIG. 13A and FIG. 13B, the same reference numerals will be assigned to components described with reference to FIG. 8A and FIG. 8B, and repetitive descriptions thereof may be omitted.

Referring to FIG. 13A and FIG. 13B, a first group pixel GP1*d* and a second group pixel GP2*d* may include first to seventh transistors T1, T2, T3-1, T3-2, T4-1, T4-2, T5, T6, T7-1*d*, and T7-2*d*, the capacitor Cst, and the light emitting element ED.

The (7-1)-th transistor T7-1*d* may include a first electrode connected to the initialization voltage line VL3, a second electrode connected in series to the (7-2)-th transistor T7-2*d*, and a gate electrode for receiving the third scan signal GB.

The (7-2)-th transistor T7-2*d* may include a first electrode connected in series to the (7-1)-th transistor T7-1*d*, a second electrode connected to the light emitting element ED, and a gate electrode.

The first clock signal GCLA may be applied to the gate electrode of the (7-2)-th transistor T7-2*d* of the first group pixel GP1*d*, and the second clock signal GCLB may be applied to the gate electrode of the (7-2)-th transistor T7-2*d* of the second group pixel GP2*d*.

Figure 14A:
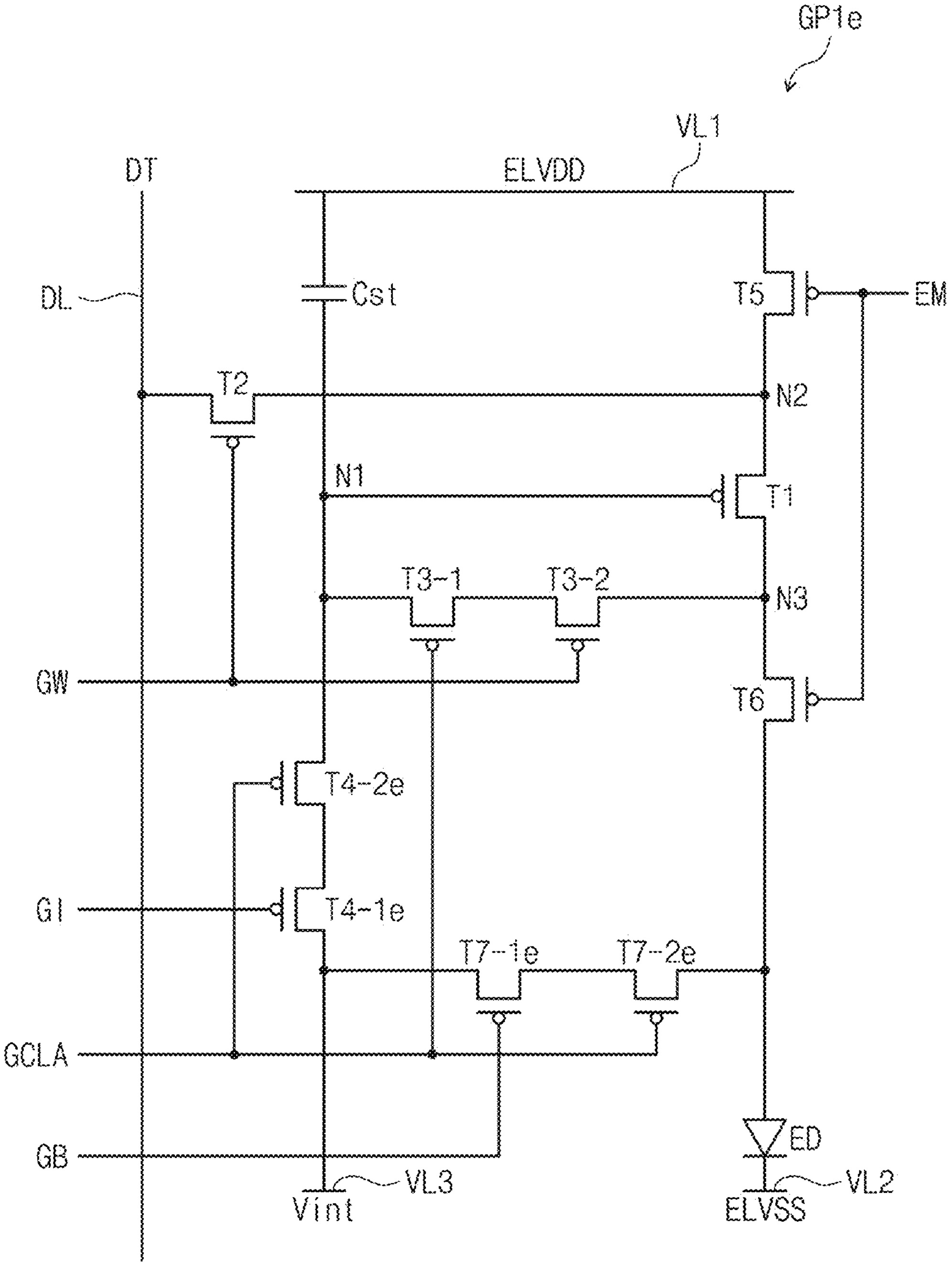
FIG. 14A is an equivalent circuit diagram of one of a plurality of first group pixels according to an embodiment of the present disclosure.
Figure 14B:
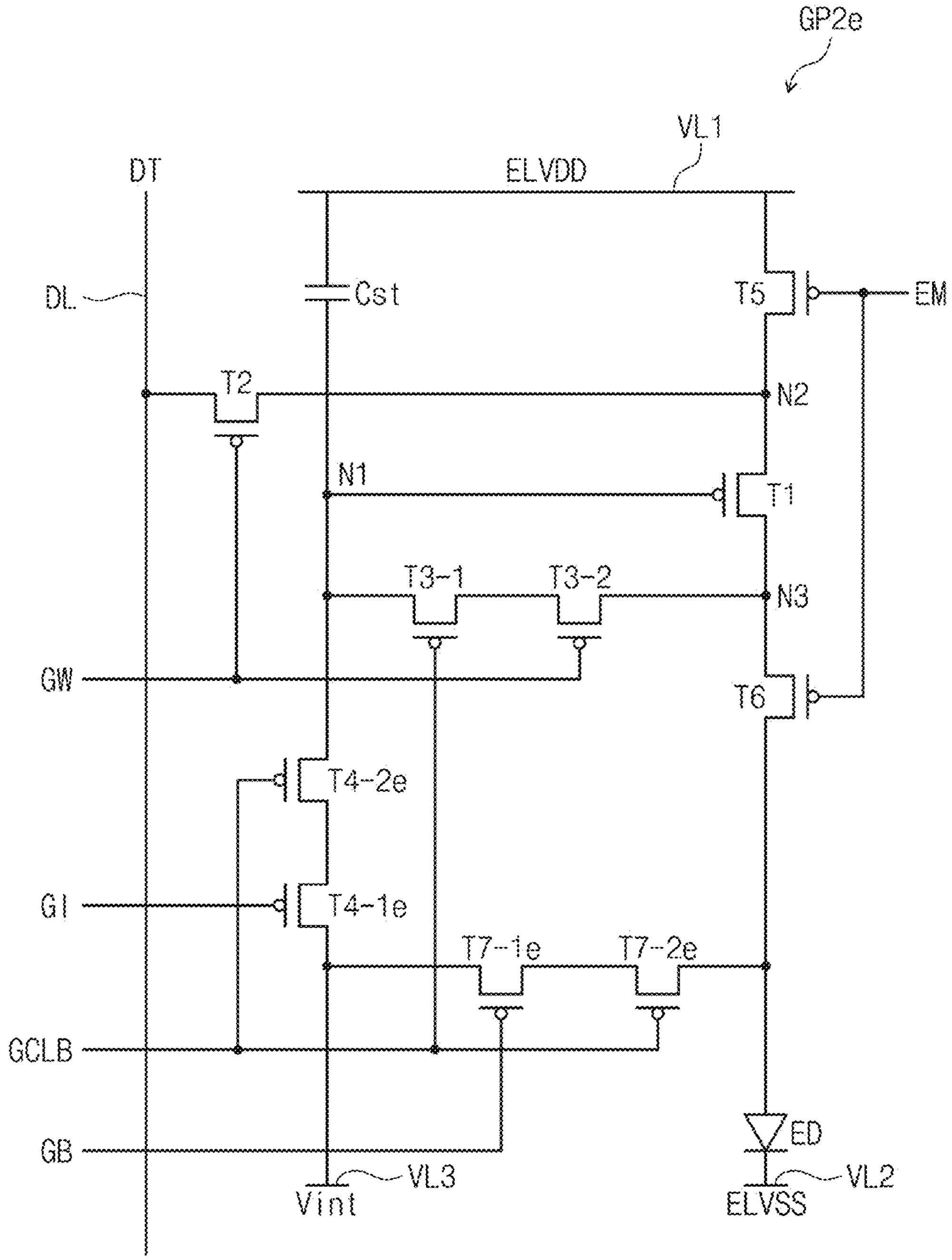
FIG. 14B is an equivalent circuit diagram of one of a plurality of second group pixels according to an embodiment of the present disclosure.

FIG. 14A is an equivalent circuit diagram of a first group pixel according to an embodiment of the present disclosure. FIG. 14B is an equivalent circuit diagram of a second group pixel according to an embodiment of the present disclosure. In the following description made with reference to FIG. 14A and FIG. 14B, the same reference numerals are assigned to components described with reference to FIG. 8A and FIG. 8B, and repetitive descriptions thereof may be omitted.

Referring to FIG. 14A and FIG. 14B, a first group pixel GP1*e* and a second group pixel GP2*e* may include first to seventh transistors T1, T2, T3-1, T3-2, T4-1*e*, T4-2*e*, T5, T6, T7-1*e*, and T7-2*e*, the capacitor Cst, and the light emitting element ED.

The (4-1)-th transistor T4-1*e* may include a first electrode connected to the initialization voltage line VL3, a second electrode connected in series to the (4-2)-th transistor T4-2*e*, and a gate electrode receiving the second scan signal GI.

The (4-2)-th transistor T4-2*e* may include a first electrode connected in series to the (4-1)-th transistor T4-1*e*, a second electrode connected to the first node N1, and a gate electrode.

The first clock signal GCLA may be applied to the gate electrode of the (4-2)-th transistor T4-2*e* of the first group pixel GP1*e*, and the second clock signal GCLB may be applied to the gate electrode of the (4-2)-th transistor T4-2*e* of the second group pixel GP2*e*.

The (7-1)-th transistor T7-1*e* may include a first electrode connected to the initialization voltage line VL3, a second electrode connected in series to the (7-2)-th transistor T7-2*e*, and a gate electrode receiving the third scan signal GB.

The (7-2)-th transistor T7-2*e* may include a first electrode connected in series to the (7-1)-th transistor T7-1*e*, a second electrode connected to the light emitting element ED, and a gate electrode.

The first clock signal GCLA may be applied to the gate electrode of the (7-2)-th transistor T7-2*e* of the first group pixel GP1*e*, and the second clock signal GCLB may be applied to the gate electrode of the (7-2)-th transistor T7-2*e* of the second group pixel GP2*e*.

Figure 15A:
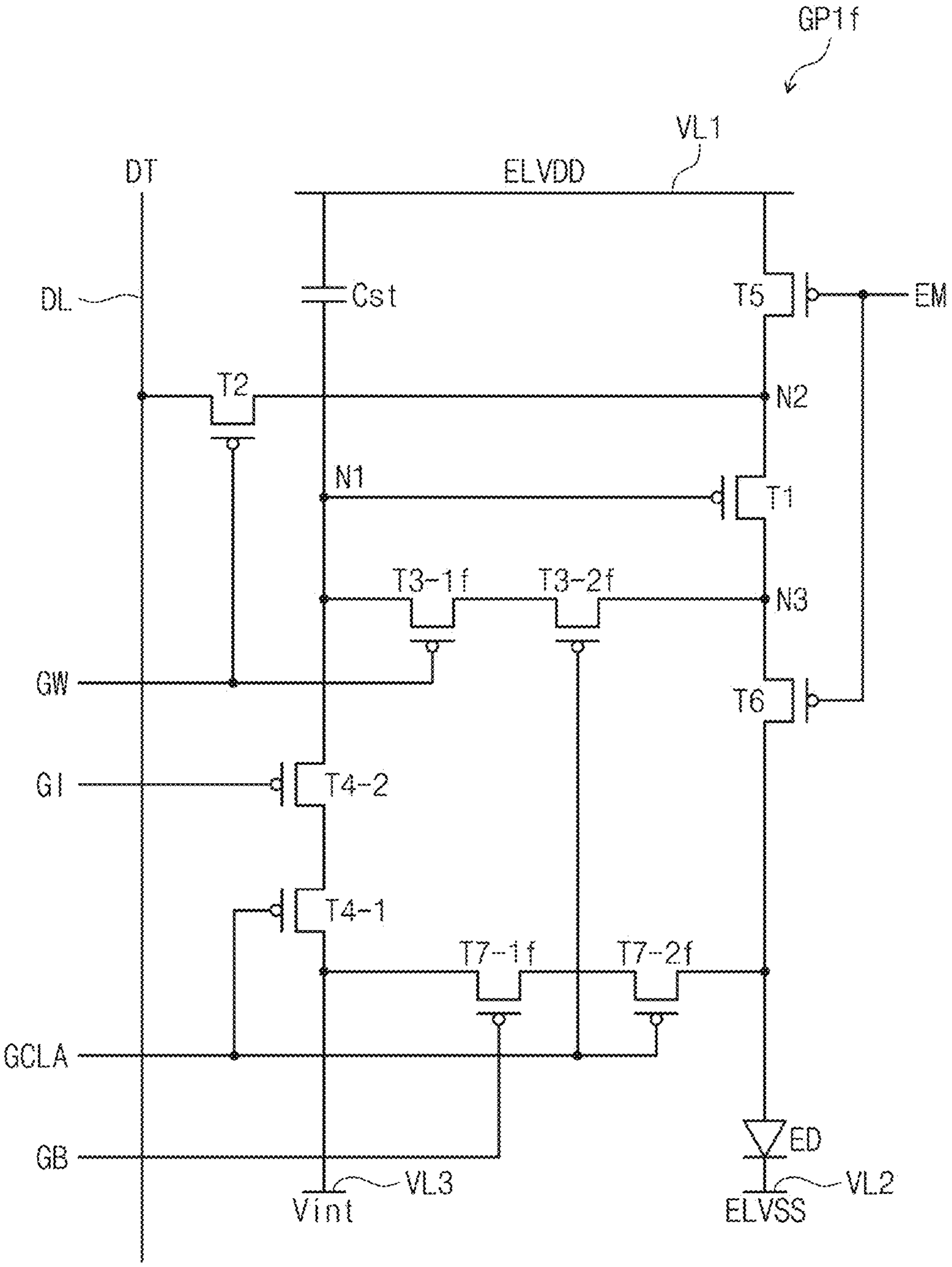
FIG. 15A is an equivalent circuit diagram of one of a plurality of first group pixels according to an embodiment of the present disclosure.
Figure 15B:
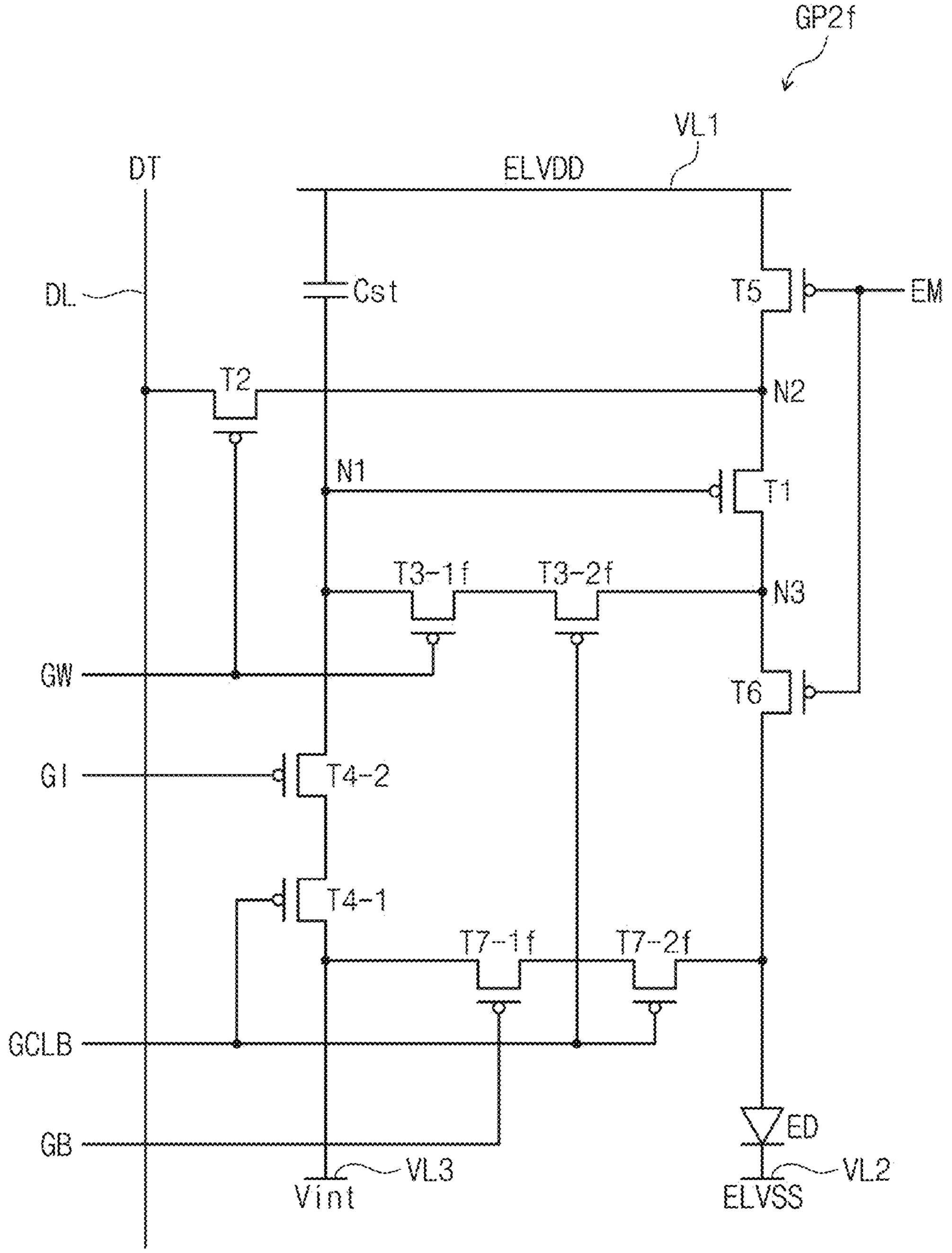
FIG. 15B is an equivalent circuit diagram of one of a plurality of second group pixels according to an embodiment of the present disclosure.

FIG. 15A is an equivalent circuit diagram of a first group pixel according to an embodiment of the present disclosure. FIG. 15B is an equivalent circuit diagram of a second group pixel according to an embodiment of the present disclosure. In the following description made with reference to FIG. 15A and FIG. 15B, the same reference numerals are assigned to components described with reference to FIG. 8A and FIG. 8B, and repetitive descriptions thereof may be omitted.

Referring to FIG. 15A and FIG. 15B, a first group pixel GP1*f* and a second group pixel GP2*f* may include first to seventh transistors T1, T2, T3-1*f*, T3-2*f*, T4-1, T4-2, T5, T6, T7-1*f*, T7-2*f*, the capacitor Cst, and the light emitting element ED.

The (3-1)-th transistor T3-1*f* may include a first electrode connected to the first node N1, a second electrode connected in series to the (3-2)-th transistor T3-2*f*, and a gate electrode receiving the first scan signal GW.

The (3-2)-th transistor T3-2*f* may include a first electrode connected in series to the (3-1)-th transistor T3-1*f*, a second electrode connected to the third node N3, and a gate electrode.

The first clock signal GCLA may be applied to the gate electrode of the (3-2)-th transistor T3-2*f* of the first group pixel GP1*f*, and the second clock signal GCLB may be applied to the gate electrode of the (3-2)-th transistor T3-2*f* of the second group pixel GP2*f*.

The (7-1)-th transistor T7-If may include a first electrode connected to the initialization voltage line VL3, a second electrode connected in series to the (7-2)-th transistor T7-2*f*, and a gate electrode receiving the third scan signal GB.

The (7-2)-th transistor T7-2*f* may include a first electrode connected in series to the (7-1)-th transistor T7-1*f*, a second electrode connected to the light emitting element ED, and a gate electrode.

The first clock signal GCLA may be applied to the gate electrode of the (7-2)-th transistor T7-2*f* of the first group pixel GP1*f*, and the second clock signal GCLB may be applied to the gate electrode of the (7-2)-th transistor T7-2*f* of the second group pixel GP2*f*.

Figure 16A:
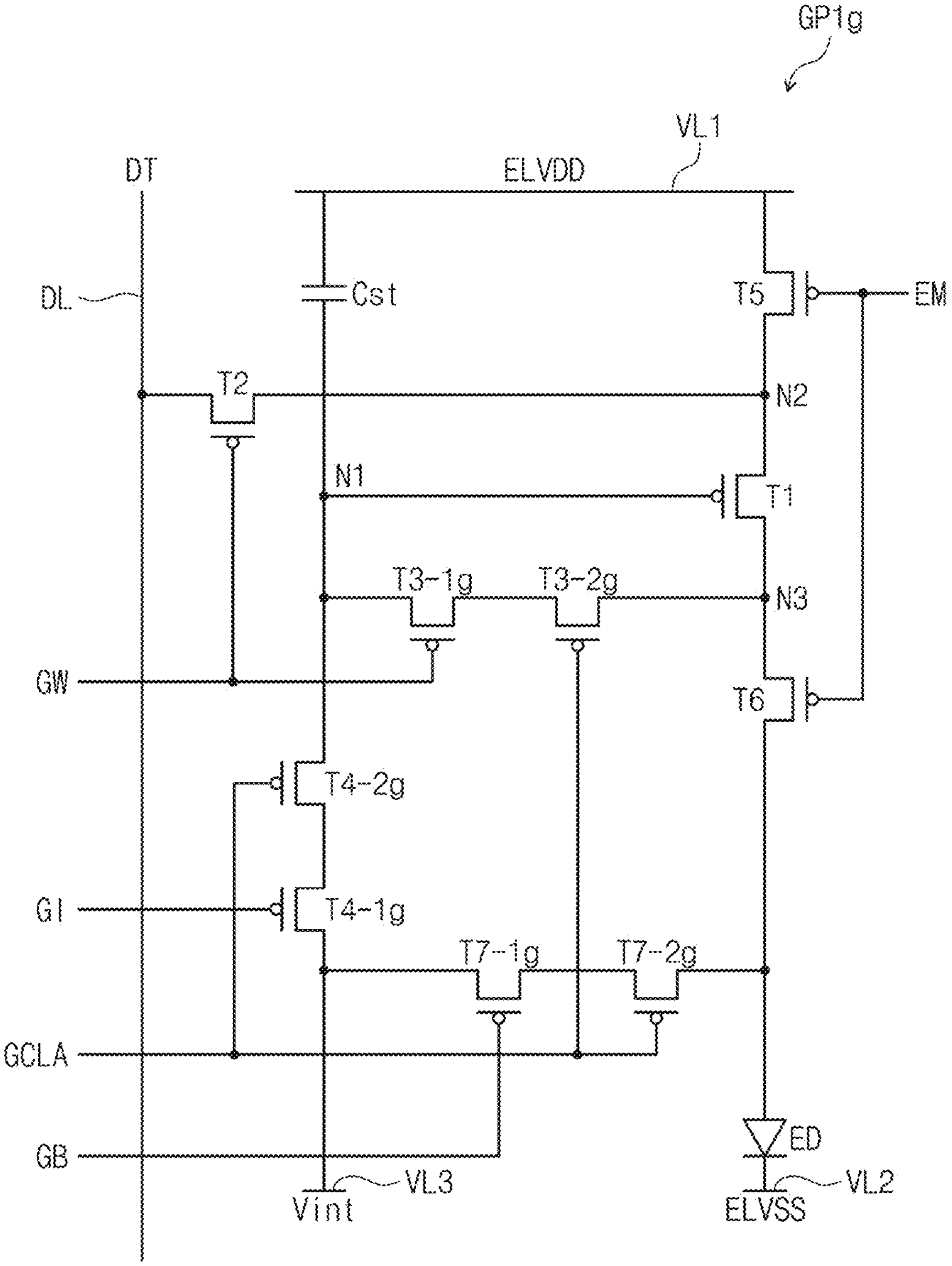
FIG. 16A is an equivalent circuit diagram of one of a plurality of first group pixels according to an embodiment of the present disclosure.
Figure 16B:
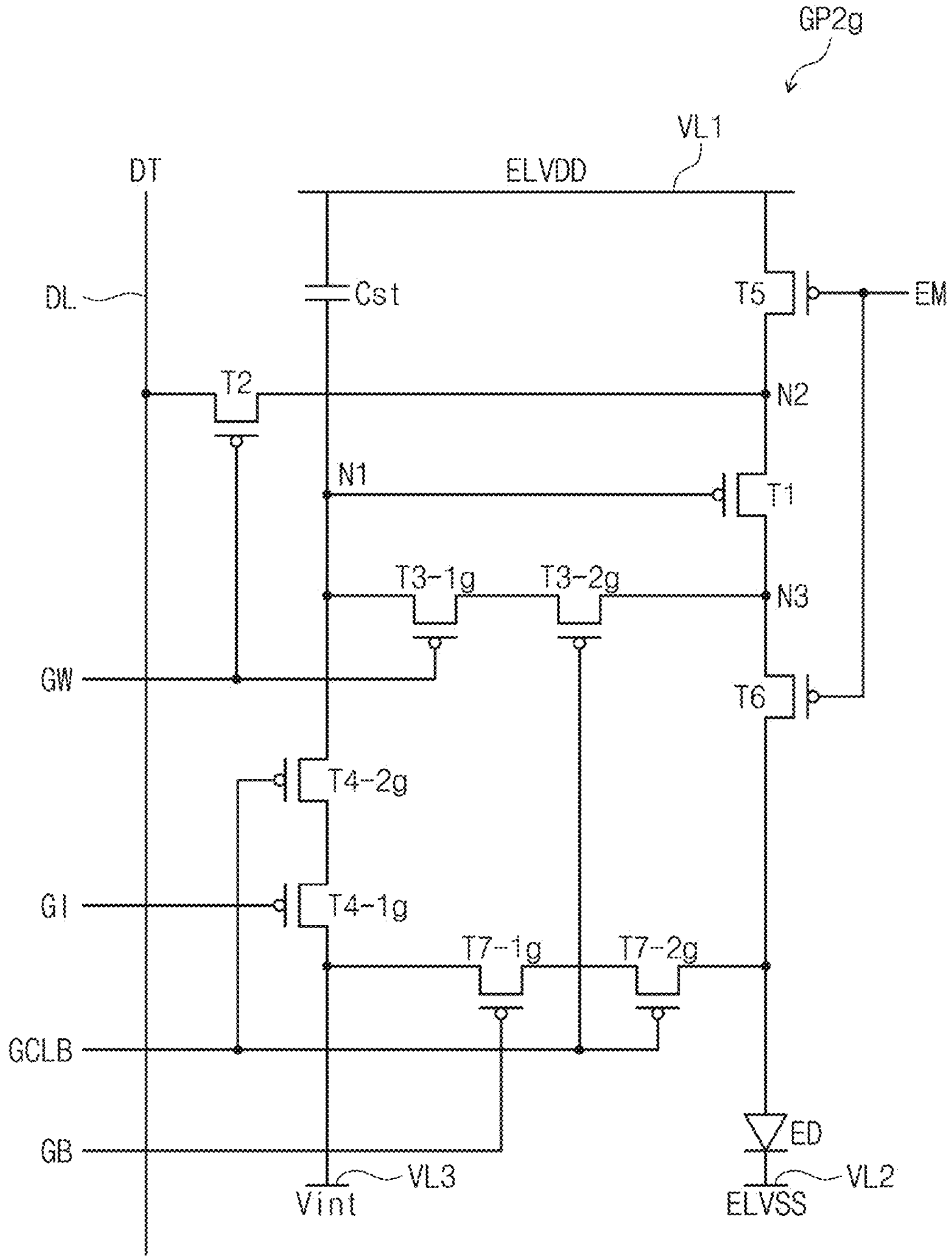
FIG. 16B is an equivalent circuit diagram of one of a plurality of second group pixels according to an embodiment of the present disclosure.

FIG. 16A is an equivalent circuit diagram of a first group pixel according to an embodiment of the present disclosure. FIG. 16B is an equivalent circuit diagram of a second group pixel according to an embodiment of the present disclosure. In the following description made with reference to FIG. 16A and FIG. 16B, the same reference numerals are assigned to components described with reference to FIG. 8A and FIG. 8B, and repetitive descriptions thereof may be omitted.

Referring to FIG. 16A and FIG. 16B, a first group pixel GP1*g* and a second group pixel GP2*g* may include first to seventh transistors T1, T2, T3-1*g*, T3-2*g*, T4-1*g*, T4-2*g*, T5, T6, T7-1*g*, T7-2*g*, the capacitor Cst, and the light emitting element ED.

The (3-1)-th transistor T3-1*g* may include a first electrode connected to the first node N1, a second electrode connected in series to the (3-2)-th transistor T3-2*g*, and a gate electrode receiving the first scan signal GW.

The (3-2)-th transistor T3-2*g* may include a first electrode connected in series to the (3-1)-th transistor T3-1*g*, a second electrode connected to the third node N3, and a gate electrode.

The first clock signal GCLA may be applied to the gate electrode of the (3-2)-th transistor T3-2*g* of the first group pixel GP1*g*, and the second clock signal GCLB may be applied to the gate electrode of the (3-2)-th transistor T3-2*g* of the second group pixel GP2*g*.

The (4-1)-th transistor T4-1*g* may include a first electrode connected to the initialization voltage line VL3, a second electrode connected in series to the (4-2)-th transistor T4-2*g*, and a gate electrode receiving the second scan signal GI.

The (4-2)-th transistor T4-2*g* may include a first electrode connected in series to the (4-1)-th transistor T4-1*g*, a second electrode connected to the first node N1, and a gate electrode.

The first clock signal GCLA may be applied to the gate electrode of the (4-2)-th transistor T4-2*g* of the first group pixel GP1*g*, and the second clock signal GCLB may be applied to the gate electrode of the (4-2)-th transistor T4-2*g* of the second group pixel GP2*g*.

The (7-1)-th transistor T7-1*g* may include a first electrode connected to the initialization voltage line VL3, a second electrode connected in series to the (7-2)-th transistor T7-2*g*, and a gate electrode receiving a third scan signal GB.

The (7-2)-th transistor T7-2*g* may include a first electrode connected in series to the (7-1)-th transistor T7-1*g*, a second electrode connected to the light emitting element ED, and a gate electrode.

The first clock signal GCLA may be applied to the gate electrode of the (7-2)-th transistor T7-2*g* of the first group pixel GP1*g*, and the second clock signal GCLB may be applied to the gate electrode of the (7-2)-th transistor T7-2*g* of the second group pixel GP2*g*.

Figure 17A:
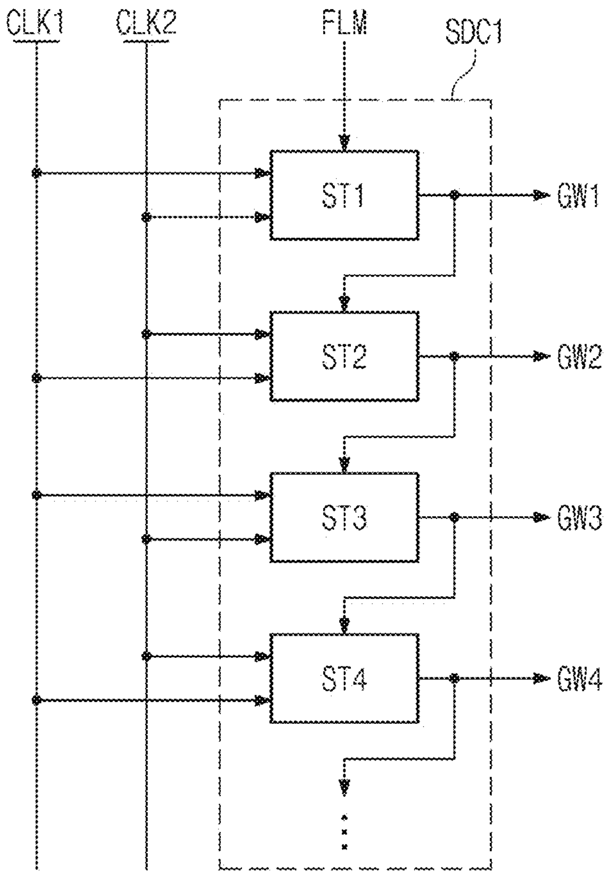
FIG. 17A is a block diagram illustrating a first driving circuit according to an embodiment of the present disclosure.

FIG. 17A is a block diagram illustrating a first driving circuit according to an embodiment of the present disclosure.

Referring to FIG. 4 and FIG. 17A, the first driving circuit SDC1 may include a plurality of scan stages ST1, ST2, ST3, and ST4. Each scan stage of the plurality of scan stages ST1 to ST4 may include a first input node and a second input node for receiving different scan clock signals. Each scan stage of the plurality of scan stages ST1 to ST4 may receive a first scan clock signal CLK1, a second scan clock signal CLK2, and a carry signal. The first driving circuit SDC1 may output the scan signals GW1, GW2, GW3, and GW4.

The plurality of scan stages ST1 to ST4 may include the first scan stage ST1, the second scan stage ST2, the third scan stage ST3, and the fourth scan stage ST4. The plurality of scan stages ST1 to ST4 may be arranged in order. Although four scan stages are illustrated in FIG. 17A, the number of scan stages according to an embodiment of the present disclosure is not limited thereto.

The plurality of scan stages ST1 to ST4 may be belong to different groups of scan stages according to the scan clock signals applied to the input nodes. For example, the first scan stage ST1 and the third scan stage ST1, which receive the first scan clock signal CLK1 on the first input node and the second scan clock signal CLK2 on the second input node may belong to a plurality of first scan stages. The second scan stage ST2 and the fourth scan stage ST4, which receive the first scan clock signal CLK1 on the second input node and the second scan clock signal CLK2 on the first input node may belong to a plurality of second scan stages.

The plurality of scan stages ST1 to ST4 may be connected to correspond to the plurality of first scan lines GWL1, GWL2, GWL3, and GWL4, respectively.

The first scan stage ST1 among the plurality of scan stages ST1 to ST4 may receive a start signal FLM, which may serve as a carry signal for the first scan stage ST1. The first scan stage ST1 may receive the start signal FLM from the driving controller TC (see FIG. 3).

Each of the remaining scan stages ST2, ST3, and ST4 among the plurality of scan stages ST1 to ST4 may receive a scan signal of the first scan signal GW1, GW2, GW3, and GW4 output from a previous scan stage and serving as the carry signal. For example, the second scan stage ST2 may receive the first scan signal GW1 output from the first scan stage ST1 and the first scan signal GW1 may serve as a carry signal for the second scan stage ST2. The third scan stage ST3 may receive the first scan signal GW2 output from the second scan stage ST2 and the first scan signal GW2 may server as a carry signal for the third scan stage ST3. The fourth scan stage ST4 may receive the first scan signal GW3 output from the third scan stage ST3 and the first scan signal GW3 may serve as a carry signal for the fourth scan stage ST4.

The phases may be shifted in the order of the first scan clock signal CLK1 and the second scan clock signal CLK2. The first scan clock signal CLK1 may have a first voltage and a second voltage repeated at a specific cycle. The first voltage may have a voltage level higher than that of the second voltage. The first voltage may be referred to as a high level. The second voltage may be referred to as a low level.

Figure 17B:
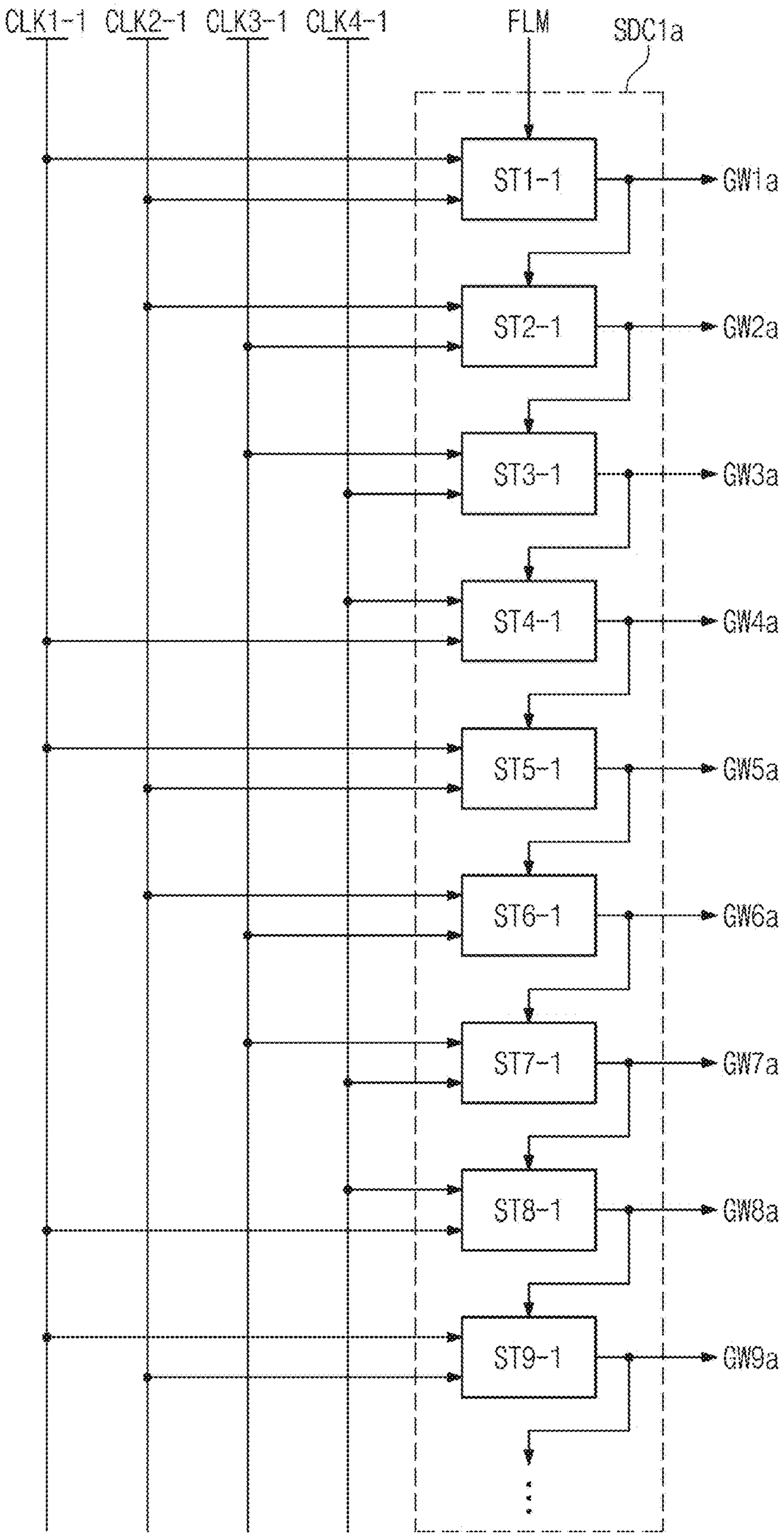
FIG. 17B is a block diagram illustrating a first driving circuit according to an embodiment of the present disclosure.

FIG. 17B is a block diagram illustrating a first driving circuit according to an embodiment of the present disclosure.

Referring to FIG. 4 and FIG. 17B, a first driving circuit SDC1*a* may include a plurality of scan stages ST1-1, ST2-1, ST3-1, ST4-1, ST5-1, ST6-1, ST7-1, ST8-1, and ST9-1. Each scan stage of the plurality of scan stages ST1-1 to ST9-1 may include a first input node and a second input node for receiving different scan clock signals.

For example, the plurality of scan stages ST1-1 to ST9-1 may sequentially receive a combination of two clock signals among a first scan clock signal CLK1-1, the scan second clock signal CLK2-1, a third scan clock signal CLK3-1, and a fourth scan clock signal CLK4-1. The plurality of scan stages ST1-1 to ST9-1 may output scan signals GW1*a*, GW2*a*, GW3*a*, GW4*a*, GW5*a*, GW6*a*, GW7*a*, GW8*a*, and GW9*a*, respectively.

The plurality of scan stages ST1-1 to ST9-1 may include the first scan stage ST1-1, the second scan stage ST2-1, the third scan stage ST3-1, the fourth scan stage ST4-1, the fifth scan stage ST5-1, the sixth scan stage ST6-1, the seventh scan stage ST7-1, the eighth scan stage ST8-1, and the ninth scan stage ST9-1. The plurality of scan stages ST1-1 to ST9-1 may be sequentially arranged. Although nine scan stages are illustrated in FIG. 17B, the number of scan stages according to an embodiment of the present disclosure is not limited thereto.

The plurality of scan stages ST1-1 to ST9-1 may be belong to different groups of scan stages according to the scan clock signals applied to the first input node and the second input node. For example, the first scan stage ST1-1, the fifth scan stage ST5-1, and the ninth scan stage ST9-1, which receive the first scan clock signal CLK1-1 on the first input node and the second scan clock signal CLK2-1 on the second input node may belong to a plurality of first scan stages. The second scan stage ST2-1 and the sixth scan stage ST6-1, which receive the second scan clock signal CLK2-1 on the first input node and the third scan clock signal CLK3-1 on the second input node, may belong to a plurality of second scan stages. The third scan stage ST3-1 and the seventh scan stage ST7-1, which receive the third scan clock signal CLK3-1 on the first input node and the fourth scan clock signal CLK4-1 on the second input node, may belong to a plurality of third scan stages. The fourth scan stage ST4-1 and the eighth scan stage ST8-1, which receive the fourth scan clock signal CLK4-1 on the first input node and the first scan clock signal CLK1-1 on the second input node, may belong to a plurality of fourth scan stages.

Among the plurality of scan stages ST1-1 to ST9-1, the first scan stage ST1-1 may receive the start signal FLM, which may server as a carry signal for the first scan stage ST1-1. The first scan stage ST1-1 may receive the start signal FLM from the driving controller TC (see FIG. 3).

The phases of the first scan clock signal CLK1-1, the second scan clock signal CLK2-1, the third scan clock signal CLK3-1, and the fourth scan clock signal CLK4-1 may be sequentially shifted. In the first scan clock signal CLK1-1, the second scan clock signal CLK2-1, the third scan clock signal CLK3-1 and the fourth scan clock signal CLK4-1, the first voltage and the second voltage may be repeated in a specific cycle.

According to the present disclosure, when four clock signals such as the first scan clock signal CLK1-1, the second scan clock signal CLK2-1, the third scan clock signal CLK3-1, and the fourth scan clock signal CLK4-1 are used, the capacitance of each of the first scan clock signal CLK1-1, the second scan clock signal CLK2-1, the third scan clock signal CLK3-1 and the fourth scan clock signal CLK4-1 may be reduced by half, and the period may be doubled, as compared to when two clock signals are used. Since each of the capacitance and the frequency may be reduced by half, the power consumption may be reduced to one-quarter (i.e., ¼). Accordingly, the display device DD (see FIG. 1) reduced in power consumption may be provided.

As described above, the first group pixel and the second group pixel may be connected to the same first scan line. As compared to the case where the first group pixel and the second group pixel may be connected to mutually different scan lines, the pixel area may be reduced. The first scan signal may be applied to the first group pixel and the second group pixel using a first driving circuit. The first group pixel and the second group pixel may be separately driven in response to the first clock signal and the second clock signal. The area of the non-display region may be reduced. In addition, the first scan signal may be applied using a first driving circuit. In this case, the power consumption in the first driving circuit may be reduced as compared to the case where the plurality of first driving circuits are driven. Accordingly, the display device may have a reduced power consumption.

Although embodiments of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device implemented as an electronic device, the display device comprising:

a plurality of data lines and a plurality of pixels, wherein each of the plurality of pixels includes:

a light emitting element;

a first transistor including a gate electrode connected to a first node, a first electrode connected to a second node electrically connected to a first power line, and a second electrode connected to a third node electrically connected to the light emitting element;

a second transistor electrically connected to a first scan line, and connected to-between a data line of the plurality of data lines and the first electrode of the first transistor; and a first-third transistor and a second-third transistor connected between the first node and the third node, wherein the plurality of data lines includes:

a plurality of first group data lines; and a plurality of second group data lines, wherein the plurality of pixels includes:

a plurality of first group pixels connected to the plurality of first group data lines; and a plurality of second group pixels connected to the plurality of second group data lines, wherein the first scan line is electrically connected to the first-third transistor in each of the plurality of first group pixels and the plurality of second group pixels, and a clock signal is applied to the second-third transistor in each of the plurality of first group pixels and the plurality of second group pixels.

2. The display device of claim 1, wherein the first-third transistor and the second-third transistor are connected in series between the first node and the third node, wherein in the plurality of first group pixels, the clock signal is a first clock signal, and the first clock signal is applied to the second-third transistor in each of the plurality of first group pixels, and wherein in the plurality of second group pixels, the clock signal is a second clock signal different from the first clock signal, and the second clock signal is applied to the second-third transistor in each of the plurality of second group pixels.

3. The display device of claim 2, wherein an activation period of the first clock signal is in a non-overlap state with an activation period of the second clock signal.

4. The display device of claim 2, wherein a frame period includes:

a first sub-frame period and a second sub-frame period subsequent to the first sub-frame period, wherein the first clock signal has an activation level and the second clock signal has a deactivation level during the first sub-frame period, and the second clock signal has the activation level and the first clock signal has the deactivation level during the second sub-frame period.

5. A display device comprising:

a plurality of data lines and a plurality of pixels, wherein each of the plurality of pixels includes:

a light emitting element;

a first transistor including a gate electrode connected to a first node, a first electrode connected to a second node electrically connected to a first power line, and a second electrode connected to a third node electrically connected to the light emitting element;

a second transistor configured to receive a first scan signal, and connected to between a data line of the plurality of data lines and the first electrode of the first transistor; and a plurality of third transistors connected between the first node and the third node, wherein the plurality of data lines includes:

a plurality of first group data lines; and a plurality of second group data lines, wherein the plurality of pixels includes:

a plurality of first group pixels connected to the plurality of first group data lines; and a plurality of second group pixels connected to the plurality of second group data lines, wherein the first scan signal and a first clock signal are applied to different transistors of the plurality of third transistors in each of the plurality of first group pixels, and the first scan signal and a second clock signal different from the first clock signal are applied to different transistors of the plurality of third transistors in each of the plurality of second group pixels.

6. The display device of claim 5, wherein an activation period of the first clock signal is in a non-overlap state with an activation period of the second clock signal.

7. The display device of claim 5, wherein a frame period includes:

a first sub-frame period and a second sub-frame period subsequent to the first sub-frame period, wherein the first clock signal has an activation level and the second clock signal has a deactivation level during the first sub-frame period, and the second clock signal has the activation level and the first clock signal has the deactivation level during the second sub-frame period.

8. The display device of claim 7, further comprising:

a demultiplexer connected to the plurality of data lines, wherein the demultiplexer includes:

a plurality of first control transistors connected to the plurality of first group data lines, respectively, to receive a first control signal; and a plurality of second control transistors connected to the plurality of second group data lines, respectively, to receive a second control signal.

9. The display device of claim 8, wherein the first control signal alternately has the activation level and the deactivation level, and the second control signal has the deactivation level, during the first sub-frame period, and the first control signal has the deactivation level and the second control signal alternately has the activation level and the deactivation level during the second sub-frame period.

10. The display device of claim 5, wherein the plurality of third transistors is formed as a first dual transistor.

11. The display device of claim 5, wherein each of the plurality of pixels further includes:

a plurality of fourth transistors connected between the first node and an initialization voltage line for applying an initialization voltage, wherein a second scan signal and the first clock signal are applied to different transistors of the plurality of fourth transistors in each of the plurality of first group pixels, and the second scan signal and the second clock signal are applied to different transistors of the plurality of fourth transistors in each of the plurality of second group pixels.

12. The display device of claim 11, wherein each of the plurality of pixels further includes:

a plurality of fifth transistors connected between the initialization voltage line and the light emitting element, wherein a third scan signal different from the second scan signal and the first clock signal are applied to different transistors of the plurality of fifth transistors in each of the plurality of first group pixels, and the third scan signal and the second clock signal are applied to different transistors of the plurality of fifth transistors in each of the plurality of second group pixels.

13. The display device of claim 12, wherein the plurality of fourth transistors are formed as a second dual transistor, and the plurality of fifth transistors are formed as a third dual transistor.

14. The display device of claim 5, further comprising:

a driving circuit configured to output the first scan signal, wherein the driving circuit includes:

a plurality of scan stages including a plurality of first scan stages and a plurality of second scan stages, wherein each scan stage of the plurality of scan stages includes:

a first input node and a second input node, wherein a first scan clock signal is applied to the first input node of each scan stage of the plurality of first scan stages, and a second scan clock signal different from the first scan clock signal is applied to the second input node of each scan stage of the plurality of first scan stages, the second scan clock signal is applied to the first input node of each scan stage of the plurality of second scan stages, and the first scan clock signal is applied to the second input node of each scan stage of the plurality of second scan stages.

15. The display device of claim 5, further comprising:

a driving circuit configured to output the first scan signal, wherein the driving circuit includes:

a plurality of scan stages including a plurality of first scan stages, a plurality of second scan stages, a plurality of third scan stages, and a plurality of fourth scan stages, wherein each scan stage of the plurality of scan stages includes:

a first input node and a second input node, wherein a first scan clock signal is applied to the first input node of each scan stage of the plurality of first scan stages, and a second scan clock signal different from the first scan clock signal is applied to the second input node of each scan stage of the plurality of first scan stages, the second scan clock signal is applied to the first input node of each scan stage the plurality of second scan stages, and a third scan clock signal different from the first scan clock signal and the second scan clock signal is applied to the second input node of each scan stage the plurality of second scan stages, the third scan clock signal is applied to the first input node of each scan stage of the plurality of third scan stages, and a fourth scan clock signal different from the first scan clock signal, the second scan clock signal, and the third scan clock signal is applied to the second input node of each scan stage of the plurality of third scan stages, and the fourth scan clock signal is applied to the first input node of each scan stage of the plurality of fourth scan stages, and the first scan clock signal is applied to the second input node of each scan stage of the plurality of fourth scan stages.

16. A display device comprising:

a plurality of pixels including a plurality of first group pixels and a plurality of second group pixels, wherein each pixel of the plurality of pixels includes:

a light emitting element;

a first transistor connected between a first power line for applying a first power supply voltage, and the light emitting element, and including a gate electrode connected to a first node;

a second transistor connected between the first transistor and a data line for applying a data signal and including a gate electrode to receive a first scan signal; and a plurality of third transistors connected between the first transistor and the first node, wherein the first scan signal and a first clock signal are applied to different transistors of the plurality of third transistors in each pixel of the plurality of first group pixels, and the first scan signal and a second clock signal different from the first clock signal are applied to different transistors of the plurality of third transistors in each pixel of the plurality of second group pixels.

17. The display device of claim 16, wherein each pixel of the plurality of pixels further includes:

a plurality of fourth transistors connected between the first node and an initialization voltage line for applying an initialization voltage; and a plurality of fifth transistors connected between the initialization voltage line and the light emitting element.

18. The display device of claim 17, wherein a second scan signal different from the first scan signal and the first clock signal are applied to different transistors of the plurality of fourth transistors in each pixel of the plurality of first group pixels, and the second scan signal and the second clock signal are applied to different transistors of the plurality of fourth transistors in each pixel of the plurality of second group pixels.

19. The display device of claim 18, wherein a third scan signal different from the second scan signal and the first clock signal are applied to different transistors of the plurality of fifth transistors in each pixel of the plurality of first group pixels, and the third scan signal and the second clock signal are applied to different transistors of the plurality of fifth transistors of the plurality of second group pixels.

20. The display device of claim 19, wherein the plurality of third transistors are formed as a first dual transistor, the plurality of fourth transistors are formed as a second dual transistor, and the plurality of fifth transistors are formed as a third dual transistor.

* * * * *